US005561458A

United States Patent [19]
Cronin et al.

[11] Patent Number: 5,561,458
[45] Date of Patent: Oct. 1, 1996

[54] ELECTRONIC IMAGING MODULE FOR REVERSIBLY CONVERTING A PHOTOGRAPHIC CAMERA INTO AN ELECTRONIC IMAGING CAMERA

[75] Inventors: David V. Cronin, Peabody; Tzu-Chiang Hsieh, Newton; James A. Ionson, Lexington; Werner Metz, Stoughton; Richard Paglia, Carlisle; David D. Pape, Framingham, all of Mass.

[73] Assignee: Polaroid Corporation, Cambridge, Mass.

[21] Appl. No.: 188,480

[22] Filed: Jan. 28, 1994

[51] Int. Cl.[6] .................................................. H04N 5/225
[52] U.S. Cl. ............................ 348/64; 348/233; 348/373
[58] Field of Search ..................................... 348/373, 376, 348/231, 207, 233, 64, 374, 375, 372; 354/170, 203

[56] References Cited

U.S. PATENT DOCUMENTS

| | | | |
|---|---|---|---|
| 4,497,556 | 2/1985 | Edwards | 354/212 |
| 4,814,811 | 3/1989 | Saito et al. | 354/412 |
| 4,823,199 | 4/1989 | Sakakibara et al. | 358/335 |
| 4,862,293 | 8/1989 | Saito et al. | 360/351 |
| 4,916,476 | 4/1990 | McGarvey | 354/432 |
| 4,933,780 | 6/1990 | Walsh et al. | 360/1 |
| 4,953,029 | 8/1990 | Morimoto et al. | 358/229 |
| 5,150,215 | 9/1992 | Shi et al. | 358/209 |
| 5,282,040 | 1/1994 | Sapir | 348/233 |

FOREIGN PATENT DOCUMENTS

| | | | |
|---|---|---|---|
| 0473516 | 3/1992 | European Pat. Off. | H04N 1/21 |
| 9220007 | 11/1992 | European Pat. Off. | H04N 5/30 |

OTHER PUBLICATIONS

Patent Abstracts of Japan, vol. 6, No. 132 (E–119), 17 Jul. 1982 & JP-A-57 058468 (Nippon Kogaku KK), 8 Apr. 1982.

Samuel D. Holland & Herbert D. Yeates, "Electronic Photography and the NASA Experience".

Primary Examiner—Wendy Garber
Attorney, Agent, or Firm—Christopher P. Ricci

[57] ABSTRACT

An electronic imaging module is disclosed which is removably insertable into a photographic camera for reversibly converting the camera into an electronic imaging camera. The electronic imaging module includes a sensing unit, a processing unit, and a coupling unit. The sensing unit detects an object image and converts the image to a corresponding electrical signal. The processing unit, which is configured for location within the camera's film cassette holder, includes a storage unit for storing the electrical signal and a transmission link for transmitting the electrical signal to external devices such as a control unit or a base unit. The coupling unit couples the sensing unit to the processor unit. The coupling unit is adjustable to ensure that the sensing unit is in alignment with the camera optical path and the film plane and the processing unit is secured within the film cassette holder.

17 Claims, 20 Drawing Sheets

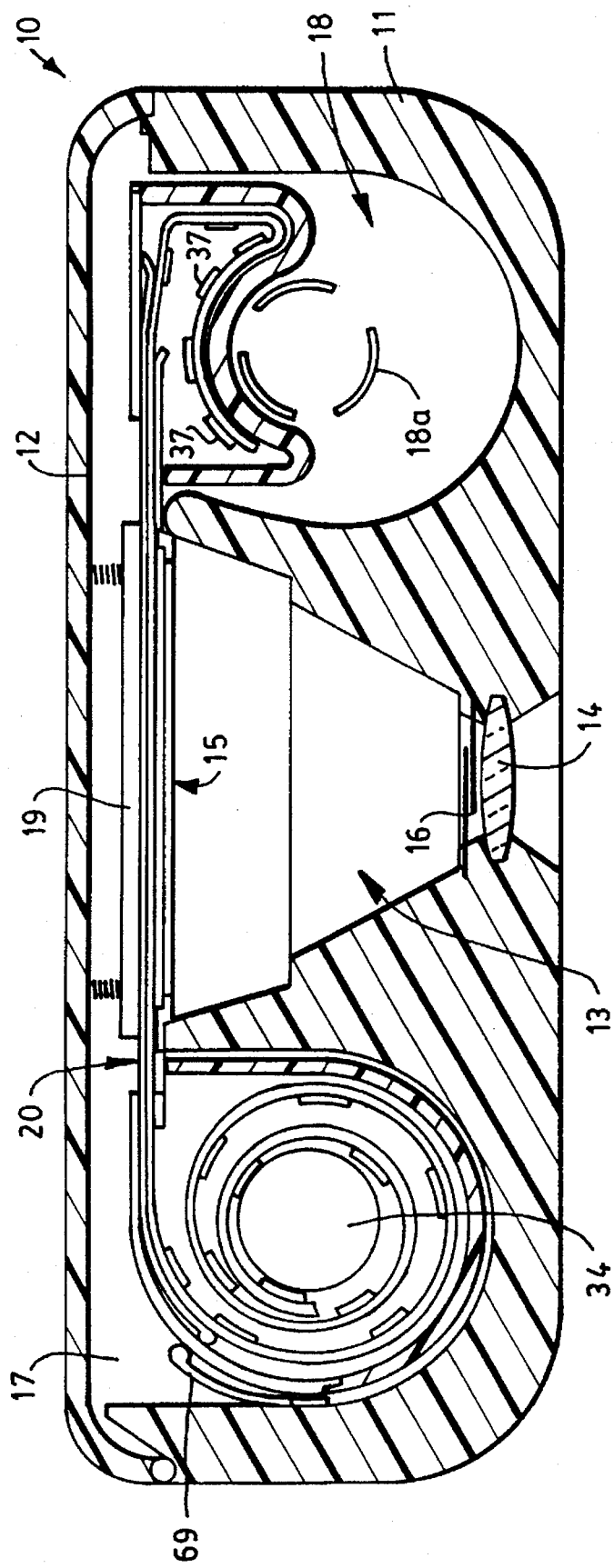
FIG. IA

ELECTRONIC IMAGING MODULE FOR REVERSIBLY CONVERTING A PHOTOGRAPHIC CAMERA INTO AN ELECTRONIC IMAGING CAMERA

BACKGROUND OF THE INVENTION

1. Field of the Invention

The present invention relates generally to conventional photographic cameras and more particularly to an electronic imaging module that is removably insertable therein for reversibly converting such a conventional camera into an electronic imaging camera.

2. Description of the Prior Art

In conventional photographic cameras, image recording typically is performed by sequentially projecting optical images of subjects onto a roll of film formed from a silver halide based emulsion. Photons strike chemical grains in the silver halide emulsion and form a latent images that are stored in the emulsion. After completing exposure of all the frames on the roll of film, the latent images are developed by chemical processing and are viewed directly or printed on positive paper.

While conventional photographic camera and film systems do produce high resolution, continuous tone photographs at modest cost, such systems do have certain limitations. For example, image storage and retrieval is inconvenient and time consuming, and it is difficult and costly to copy, modify or transmit photographic images. Also, to use such images in electronic computer or video systems, the photographic image must first be converted to an electronic image in the form of an electrical signal which is representative of the photographic image.

To overcome these limitations, cameras have been implemented with special electronic means such as a charge-coupled device (CCD) for recording images electronically and a storage device such as a tape, disk or a memory circuit for storing electrical image signals. The image signals are transferred to a display device like a CRT for direct viewing or a printer for printing. The advantages are that the electronic images can be easily modified in format, resolution, color mapping, and special optical effects can be added. Also, the images may be easily transmitted to remote locations.

Electronic imaging systems incorporating the foregoing features are well known. For example, U.S. Pat. No. 4,916,476, issued to McGarvey, discloses an electro-optical circuit for converting a conventional single lens reflex (SLR) camera into an electro-optical camera. The electro-optical circuit is attached to the film back of the camera so that it is operational as a still camera or as an electro-optical camera.

U.S. Pat. Nos. 4,953,029 issued to Morimoto et al. and 4,814,811 issued to Saito et al. disclose still camera systems that are capable of being loaded with film backs or still video backs 2 for forming an image and transferring it onto a magnetic media.

U.S. Pat. No. 4,862,293 issued to Saito et al. discloses a still video adapter attached to a still video back at the rear cover of a SLR camera body. The still video adapter includes a CCD for receiving an image of an object photographed, a signal processing circuit for processing and transferring the image data to a magnetic disk attached to the side of the camera.

Another electronic still camera system using an adapter is shown by Holland in *Electronic Photography and the NASA Experience*. In this system, there is shown a removable hard drive attached to the side of a Nikon F4 camera via an adapter. Images are recorded on the hard drive and sent to a control station for viewing and printing.

U.S. Pat. No. 5,150,215 issued to Shi, discloses a camera system having film and still video functions. This camera operates in three modes. In the first mode, the camera is in a still video image mode only. In the second mode, the camera is in the photo film mode only. In the third mode, the camera is in the still video image mode and the film photo mode simultaneously.

SUMMARY OF THE INVENTION

The above electronic imaging systems are expensive and require special attachments to the cameras such as interchangeable film backs and adapters. Both the interchangeable film back and the adapter are bulky and occupy a substantial amount of room in the camera. Furthermore, the film back and the adapter are not very practical to the average camera user. Most camera users are familiar with the operation of conventional cameras, but are hesitant to spend the time and effort trying to learn how to use these cumbersome film backs or adapters.

Therefore, it is a primary object of the present invention to provide an electronic imaging module that is capable of being easily retrofitted into a variety of conventional photographic cameras without having to use interchangeable film backs or special adapters.

Another object of the present invention is to provide an electronic imaging module that is removably insertable in the conventional camera at its film cassette holder location. This feature gives the user the options of using conventional silver halide film with the camera or reversibly converting the camera into an electronic imaging camera.

Still another object of the present invention is to provide an electronic imaging module that is capable of communicating with a remote control unit and a base unit for immediate image viewing and printing.

Yet another object of the present invention is to provide a method employing an electronic imaging module for reversibly converting a conventional photographic camera into an electronic imaging camera.

Thus, in accordance with the present invention, there is disclosed an electronic imaging module that is removably insertable in a conventional camera wherein at least a portion of the electronic imaging module occupies the camera's film supply or cassette holding location.

The electronic imaging module includes means for sensing an object image in accordance with the camera film format and converting the object image into an electrical signal corresponding to the object image. A processing means processes the electrical signal into a format suitable for transmission. A coupling means couples the sensing means to the processing means. The coupling means is adjustable to align the sensing means with the camera optical path and film plane and maintain the processing means within the camera film cassette holder location.

In a second embodiment of the present invention, the electrical signal in the processing means is transmitted immediately to an external control unit by a wireless transmitting means. The control unit receives the electrical signal at a wireless communication means. The control unit has a command panel for controlling the resolution, storage, display, and transmission of the electrical signal. Also, included is a display for viewing the images.

In a third embodiment of the present invention, the electrical signal is stored in the processing means at a storage means. After all the frames on the electronic imaging module have been taken, the module is removed from the camera and inserted into a base unit. A wired transmission means transmits the electrical signal to the base unit at a communication means. The base unit includes a processing means for processing the electrical signal, a storage means for storing the electrical signal, a display for displaying electrical signal as an object image and a printer for printing the object image.

In a fourth embodiment of the present invention, the electronic imaging module, the control unit, and the base unit are used in cooperation. In this embodiment, the processing means simultaneously stores the electrical signal in the storage means and transmits the electrical signal to the external control unit. The electrical signal stored in the storage means is retrieved later by inserting the module in the base unit. On the other hand, the object image received at the control unit is viewed immediately. A link is provided, so that the user can transmit the image from the control unit to the base unit for initiating storage or printing.

Embodiments of the present invention are disclosed for use in connection with photographic cameras that use conventional film and cameras that use "self-developing" film.

While the present invention will hereinafter be described in connection with several preferred embodiments and methods of use, it will be understood that it is not intended to limit the invention to these embodiments and methods. On the contrary, it is intended to cover all alternatives, modifications and equivalents as may be included within the spirit and scope of the invention as defined by the appended claims.

BRIEF DESCRIPTION OF THE DRAWINGS

FIG. 1A is a schematic cross-sectional view of a conventional 35 mm photographic camera having one embodiment of an electronic imaging module of the present invention therein.

DETAILED DESCRIPTION OF THE INVENTION

The electronic imaging modules of the present invention are disclosed as being embodied preferably for use in conventional photographic cameras which use conventional or "self-developing" film. Because the features of such conventional cameras are generally known, the description which follows is directed in particular only to those camera elements cooperating directly with the disclosed electronic imaging modules. It is to be understood, however, that other camera elements may take various forms known to a person of ordinary skill in the art.

Figure 1B:
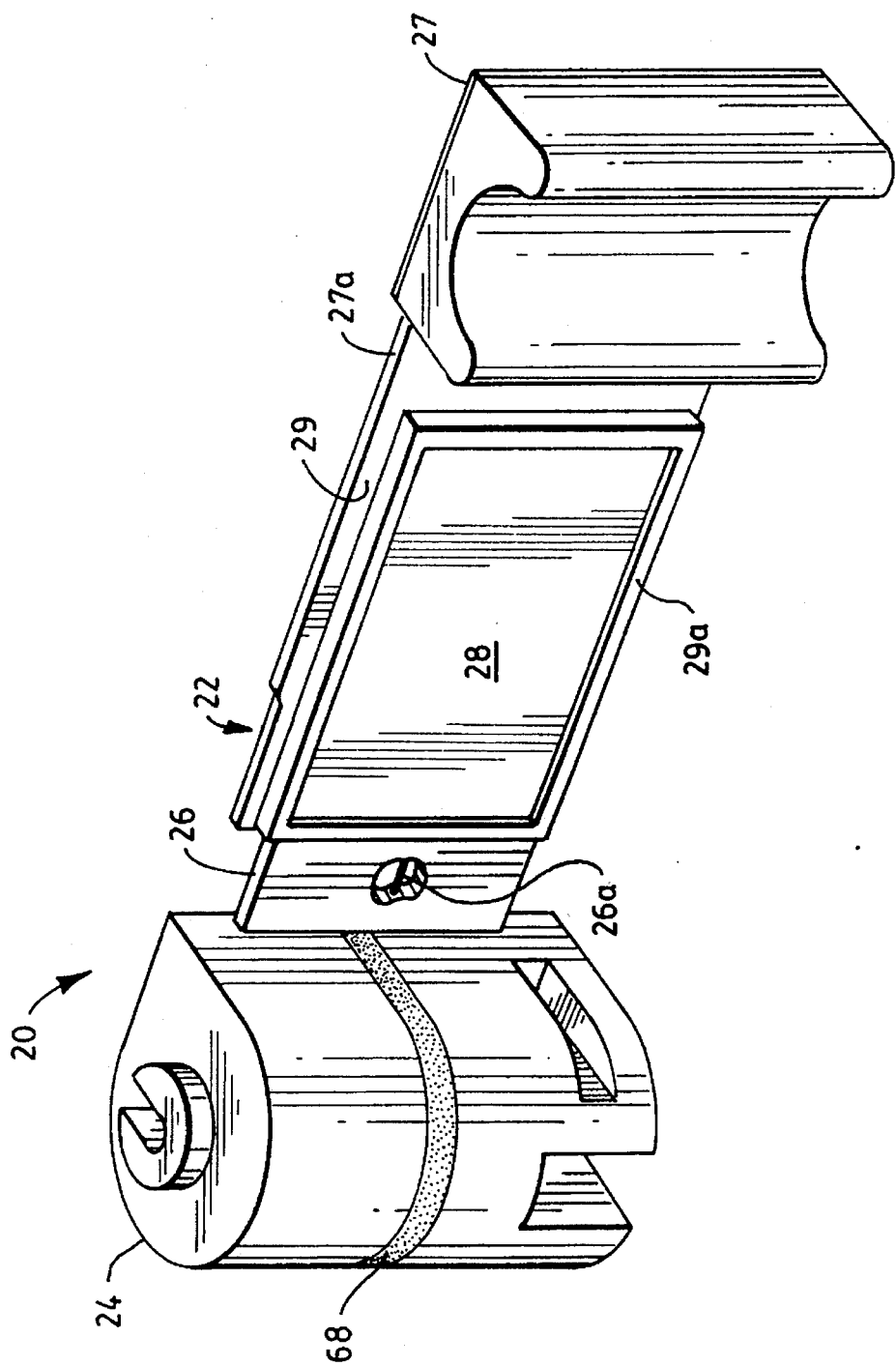
FIG. 1B is a perspective view of the electronic imaging module of FIG. 1A.
Figure 2A:
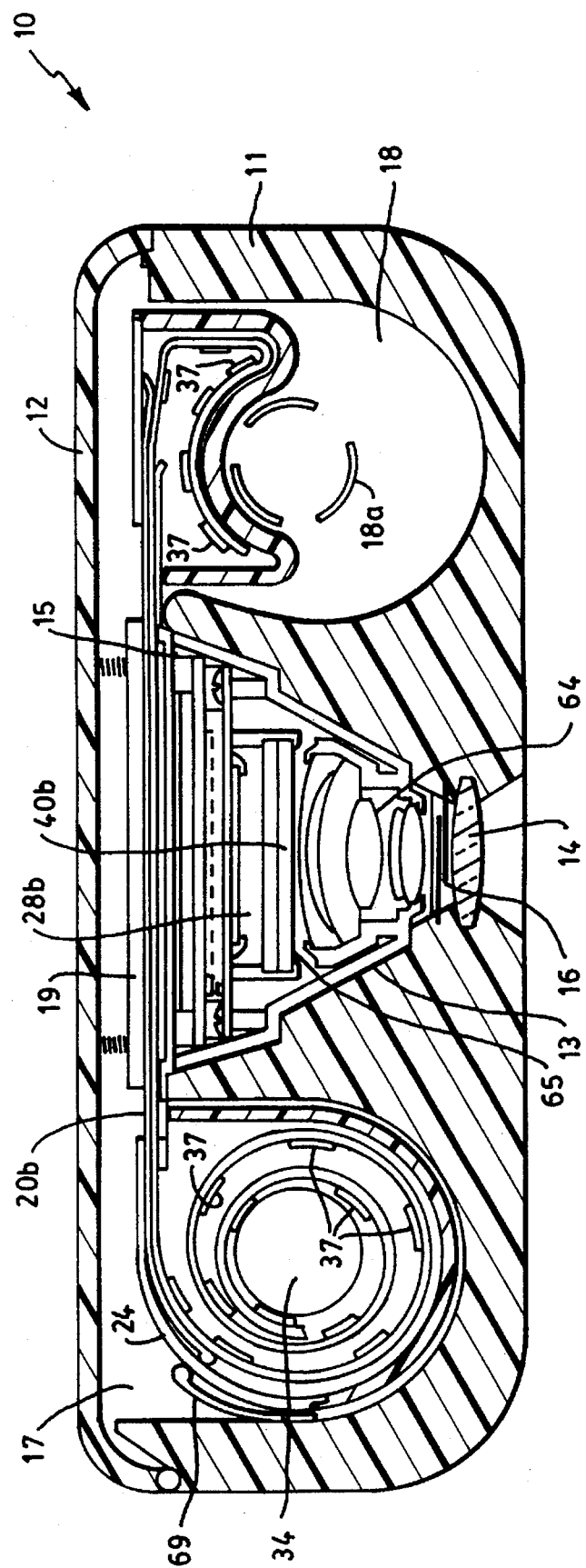
FIG. 2A is a schematic cross-sectional view of a conventional 35 mm photographic camera having another embodiment of an electronic imaging module of the present invention therein.

Referring to the drawings, FIGS. 1A and 2A show a schematic cross-sectional view of a conventional 35 mm photographic camera 10 with which electronic imaging modules incorporating the features of the present invention are adapted to be used. The illustrated camera 10 is of the direct viewing, automatic, "point and shoot" type and includes a main housing section 11 and a hinged rear door 12 providing access to the interior of the camera. Within the housing section 11 is a central cone shaped exposure chamber 13 having an objective lens 14 at the forward end for forming a focused image of a subject (object image) at an aligned film exposure or focal plane 15 at the rear of exposure chamber 13. Just behind lens 14 is a shutter 16 for controlling the transmission of image forming light from lens 14 to exposure plane 15. Disposed laterally on opposite sides of exposure chamber 13 is a film supply chamber 17 for removably receiving a standard 35 mm film cassette (not shown) holding a roll of conventional, silver halide photographic film therein; and a film take-up reel chamber 18 having a film take-up reel 18a therein onto which the exposed portion of the film roll is wound for storage until all frames of the film have been exposed. At the rear of exposure chamber 13 is a pressure plate 19, which is spring mounted on the interior of rear door 12, for urging that portion of the film extending across the rear opening of exposure chamber 13 into its proper position at the film exposure plane 15.

One aspect to the present invention is to provide means, in the form of an electronic imaging module, that is adapted to be easily and removably inserted into a conventional photographic camera, for example the illustrated camera 10, for reversibly converting such a camera into an electronic imaging camera. As will become apparent, such a module is designed to be easily inserted and removed without the need for special tools or skills. The use of such an electronic imaging module does not in anyway impair the camera's capability to function again as a conventional photographic camera once the module has been removed.

One such electronic imaging module 20 embodying the present invention is shown in perspective in FIG. 1B and at its operative position within camera 10 in FIG. 1A.

The object image formed by lens 14 is sensed by a later to be described central sensor unit 22 of module 20 located at the film exposure plane 15 of camera 10. One end unit 24 of the electronic imaging module 20 is removably inserted and received in camera 10 at its film cassette holder location within film supply chamber 17. In this illustrated embodiment, the electronic imaging module 20 includes an optional opposite end unit 27 which is removably inserted and received in take-up reel chamber 18. The central sensor unit 22 of electronic imaging module 20 is urged into it operative position at exposure plane 15 by pressure plate 19 located on the inside of rear door 12. In this particular module 20, the object image formed by the lens 14 is detected by the sensor unit 22 which produces an electrical signal representative of the image. Module 20 processes this signal for either storage within the module 20 or transmission to later to be described remote means for immediate viewing or printing.

Views of the electronic imaging module 20 are shown in further detail in FIGS. 1A, 1B, 3A–3B and 5. The illustrated electronic imaging module 20 is shown as having the central sensing unit 22, a processing unit 24 at one end, a coupling unit 26 coupling sensing unit 22 to processing unit 24, an optional component housing unit 27 at the opposite end, and its associated coupling unit 27a for physically coupling unit 27 to sensing unit 22. As will become apparent later, electronic components in housing unit 27 may be electrically connected to components in sensing unit 22 and/or processing unit 24. The sensing unit 22 includes a sensor with support circuitry 28 centrally mounted on a flat base plate 29 which has a peripheral, forwardly projecting, rectangular, locating frame or rib structure 29a that is dimensioned to closely fit into the rear opening of exposure chamber 13 and thus accurately locate the sensor 28 with respect to the optic axis of lens 14. Portions of base plate 29 outboard of frame 29a engage the back end of the exposure chamber defining wall to accurately locate sensor 28 at the exposure or film plane 15.

Figure 3A:
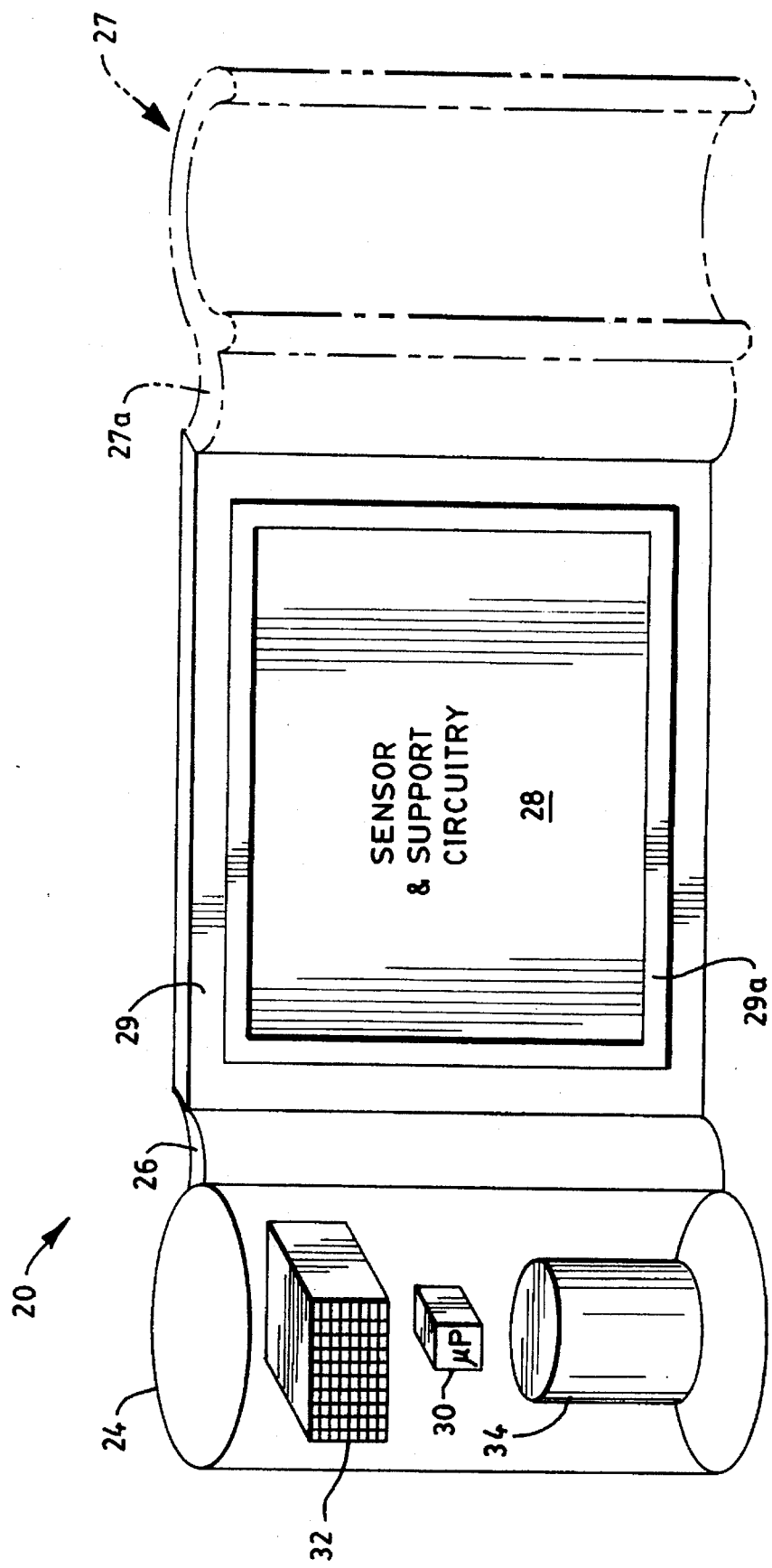
FIGS. 3A–3B are diagrammatic perspective views of an electronic imaging module of the present invention.
Figure 3B:
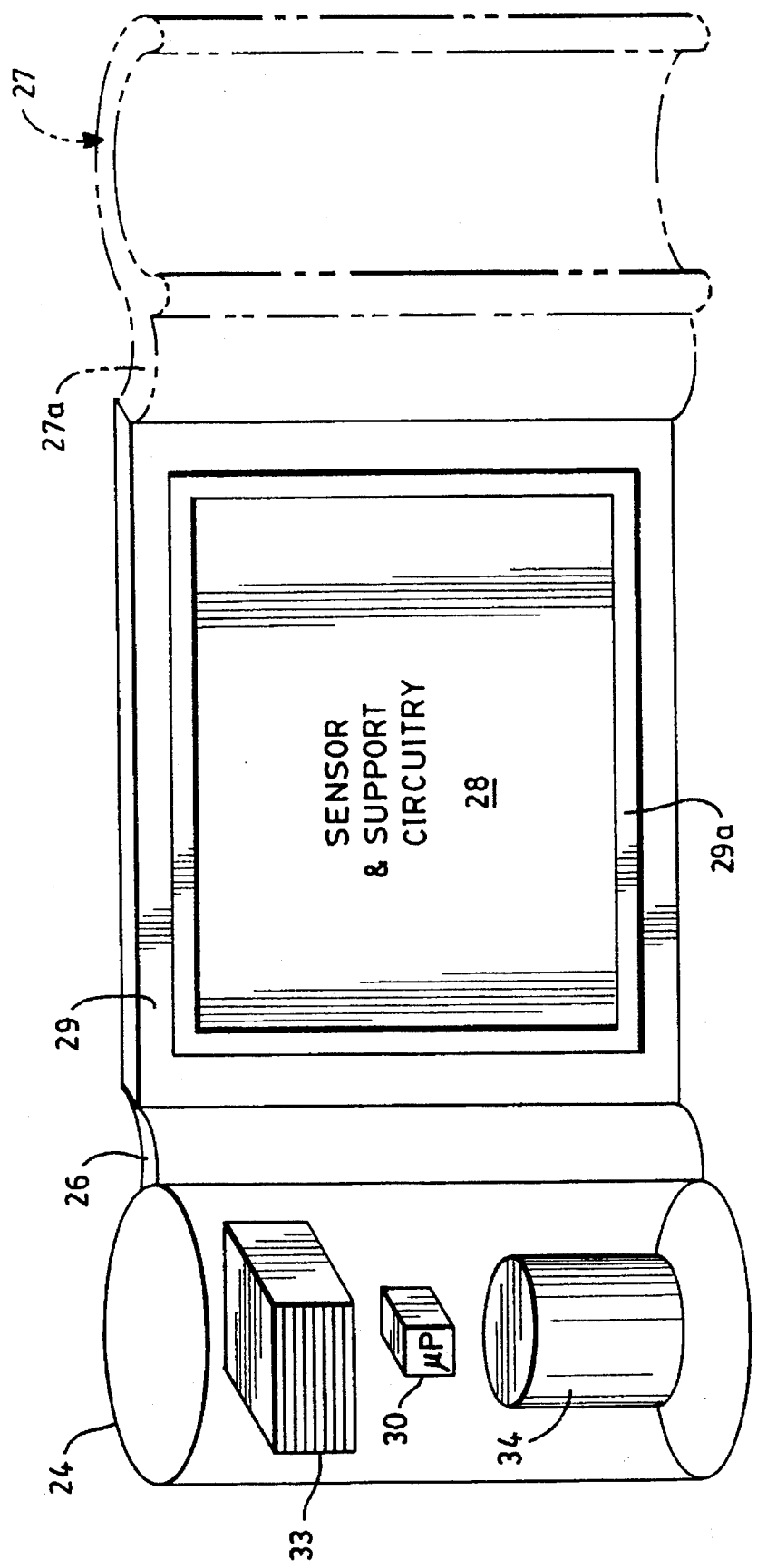

With reference to FIGS. 3A and 3B, the processing unit 24 includes a microprocessor 30 typically with either a wireless transmission link 32 (FIG. 3A) or an image storage unit 33 with a wired transmission link (FIG. 3B). However, it is within the scope of the present invention to provide a processing unit 24 that includes both a wireless transmission link 32 and a storage unit 33.

As used herein, the term "wired" means that an electronic device, such as storage unit 33, is configured to receive and or transmit electrical signals over an electrically conductive wire, cable, data bus, or the like connected thereto.

Processing unit 24 may include a battery 34 for powering the various electronic components of module 20, or the battery 34 (and/or other module components) optionally may be housed in optional component unit 27. While the diagrammatically illustrated battery 34 is cylindrical, it may be configured as a thin flat or curved battery to more readily conform to the contours of optional component housing 27.

The coupling unit 26, and optional coupling unit 27a if unit 27 is used, are flexible connectors which, respectively, mechanically and electrically couple the sensing unit 22 to the processing unit 24, and couple component housing unit 27 to sensing unit 22 and/or processing unit 24. The reason the coupling units 26 and 27a are made flexible is to provide a some amount of width adjustment in the electronic imaging module 20 to accommodate a wide variety of 35 mm cameras. Alternatively, the coupling units 26 and 27a may be formed as telescoping sliders to provide such width adjustment.

In 35 mm cameras that are designed to accept standard 35 mm film cassettes, it has been found that: there are not specified standard lateral dimensions for the distance between the optic axis of lens 14 and the central axis of a 35 mm film cassette located in supply chamber 17 or the distance from the lens axis and the axis of take-up spool 18a; and these dimensions vary somewhat in different cameras. Thus, by providing flexible coupling units 26 and 27a (if used) in electronic imaging module 20, the lateral spacing of the major module components may be adjusted to accommodate a wide variety of 35 mm cameras. Accordingly, when the electronic imaging module 20 is inserted into the camera 10, the processing unit 24 can be positioned in the film cassette holder location in film supply receiving chamber 17 and the sensing unit 22 can be held in alignment with the camera's optic axis and the focal plane. Also, if optional component housing unit 27 is used, it may be easily aligned with the take-up reel 18a.

Figure 2B:
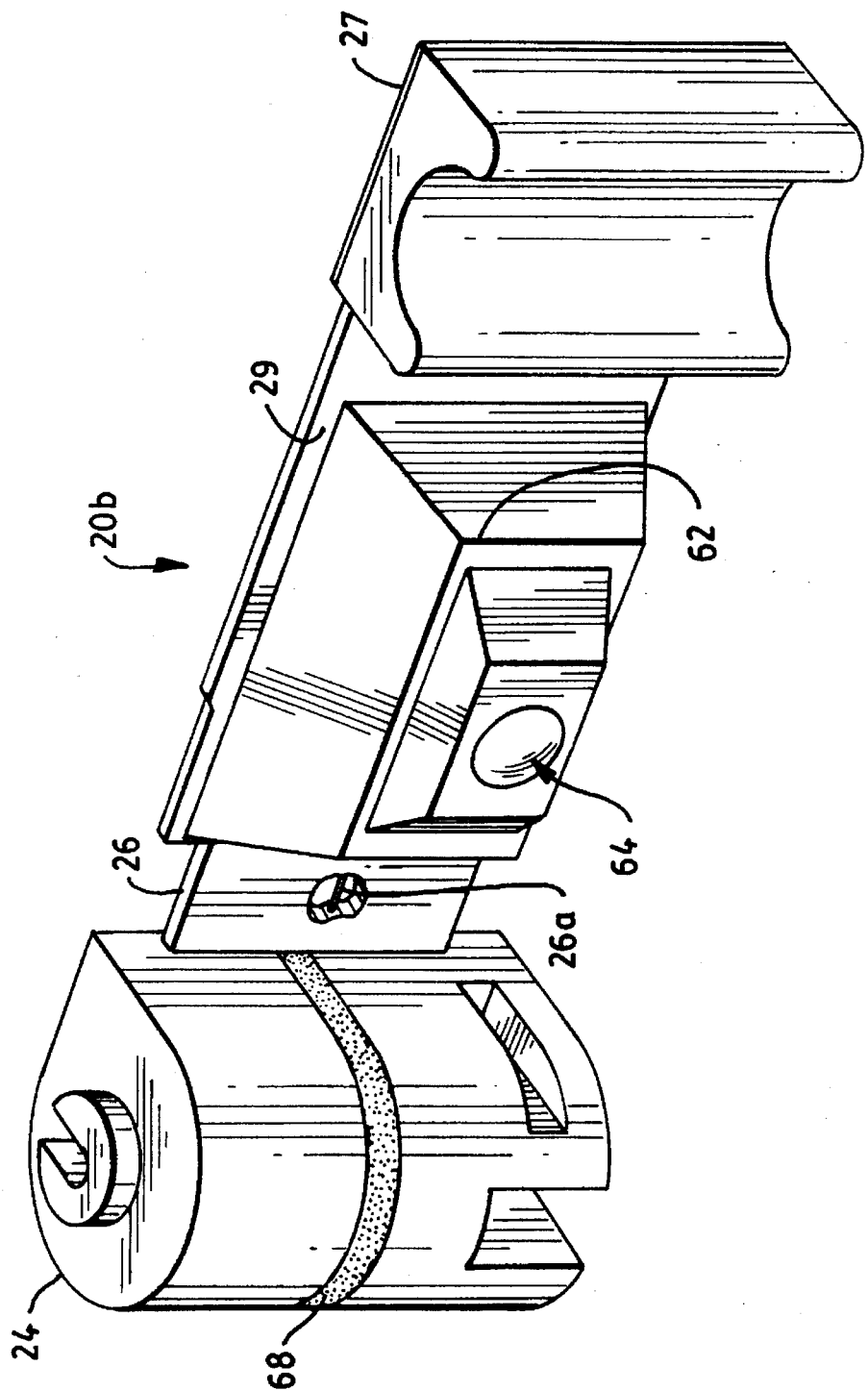
FIG. 2B is a perspective view of the electronic imaging module of FIG. 2A.

Flexible couplings 26 and 27a may be made of any of the well known flex circuit materials which typically have electronic components connected to thin flexible copper conductors bonded to a thin, flexible, plastic, insulating base material such as Kapton®, Mylar® or the like. One such conductor 26a of coupling 26 is shown in FIGS. 1B and 2B in a section that has been cut away for illustrative purposes.

It has also been found that while there is no standard specified dimensions for the rear opening of the exposure chamber 13 adjacent the film exposure plane 15, there is very little variation in the size of this opening in a wide variety of 35 mm cameras. Thus, a fixed sized locating frame or rib structure 29a on sensing unit 22 will serve to accurately align unit 22 with respect to the objective lens optic axis and the film exposure plane. Alternatively, the ribs forming frame 29a may be mounted on base plate 29 so that their positions may be varied to make the size of the locating frame 29a adjustable to fit an even larger variety of 35 mm cameras.

Figure 5:
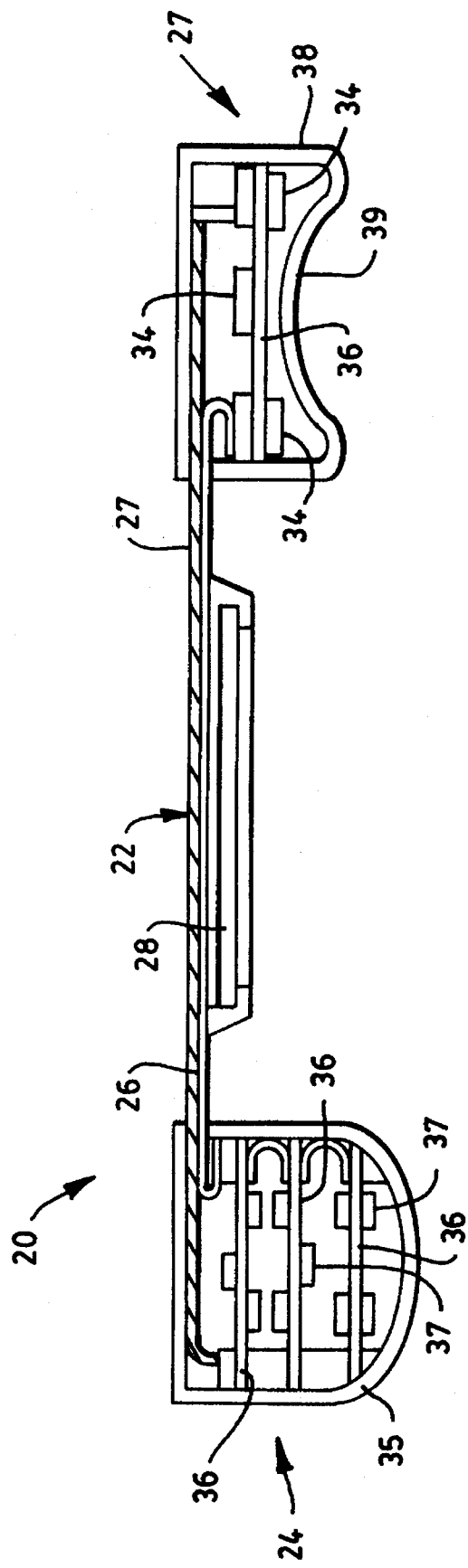
FIG. 5 is a cross-sectional view of the electronic imaging module of FIG. 1A.
Figure 6:
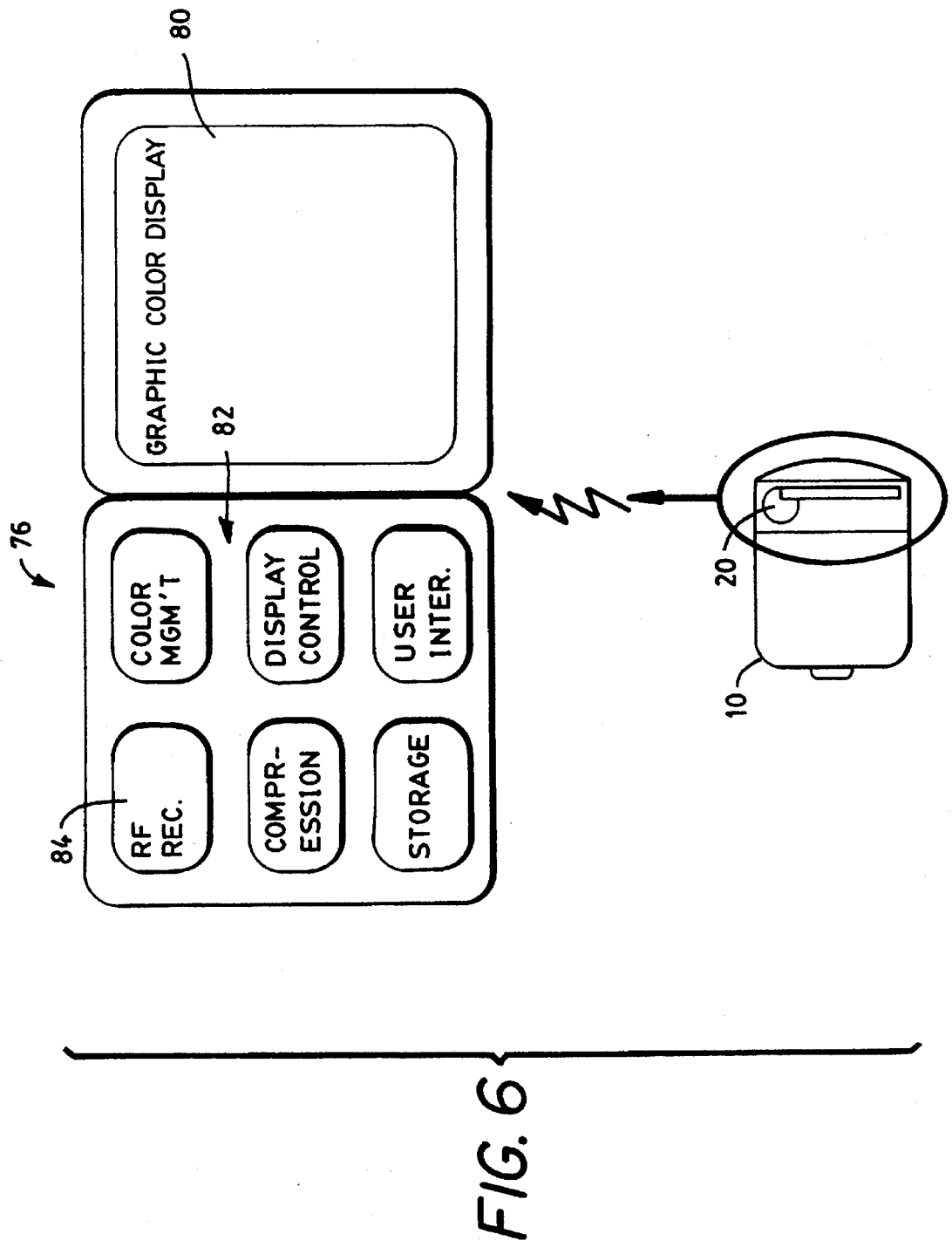
FIG. 6 is a schematic representation of the electronic imaging module interacting with an external control unit.

FIG. 5 shows electronic imaging module 20, including the optional component housing 27, in cross-section. The processing unit 24 comprises a hollow housing 35, having the general shape and size of a 35 mm film cassette, in which is stored a stack of electrically interconnected circuit boards 36 have various electrical components and subsystems 37 of the micro processor 30, storage unit 32 or wireless link 33 thereon. Such components and subsystems that need to be connected to the sensor unit 22 are so connected by the coupling unit 26. Unit 27 comprises a hollow housing 38 that is dimensioned to fit into the camera take-up spool chamber 18 and includes a concave bottom wall section that conforms to and provides clearance for the take up spool 18a. Inside is a circuit board 36 having components mounted thereon that electrically connected to sensor unit 22 and/or processing units via coupling units 27 and 26. In this illustration, the components are a plurality of small batteries 34 for powering module 20. Alternatively, a single battery 34, may be provided in housing 38.

As an alternative to using rigid circuit boards 36 in the processing unit 24 and optional housing 27, various components 37 may be mounted on flex circuit as shown in FIGS. 1A and 2A. In this embodiment, that portion of flex circuit in the processing unit 24 is formed into a roll with room left in the center for a battery 34. The portion of the flex circuit in housing 27 may be curved and folded to conform to the interior shape thereof.

Figure 4A:
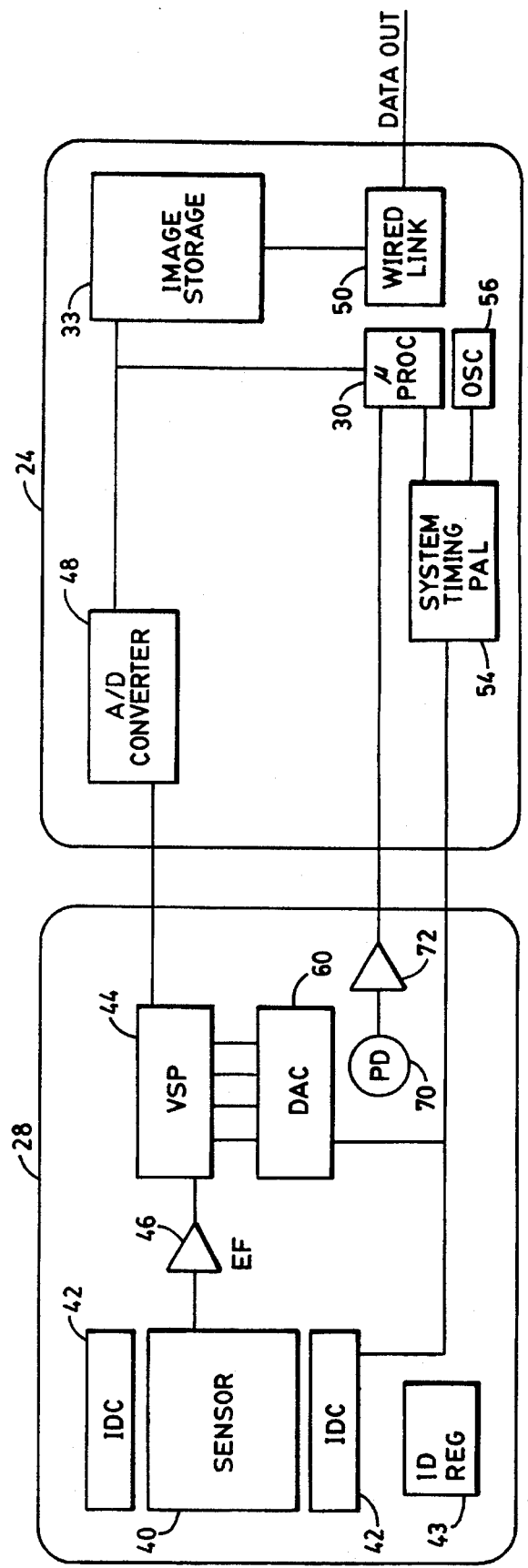
FIGS. 4A–4B are block diagrams showing the electrical functions of the electronic imaging module.
Figure 4B:
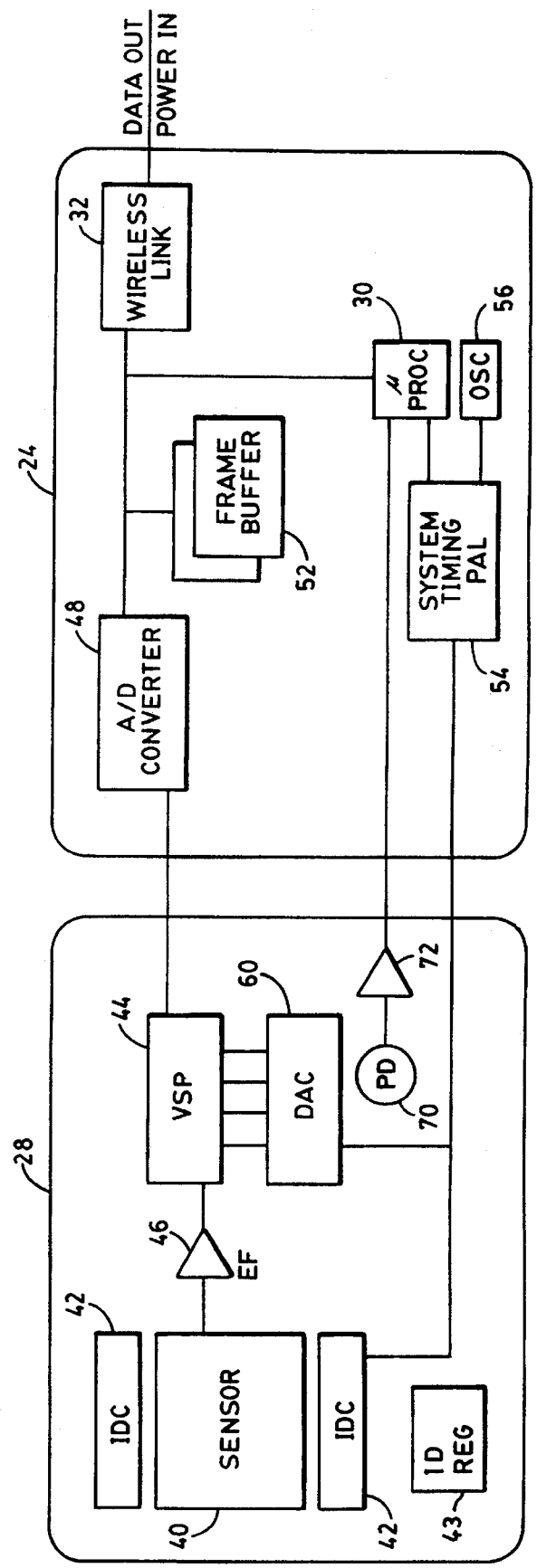

The sensing unit 22 and processing unit 24 of the electronic imaging module 20 are shown diagrammatically in further detail in FIGS. 4A–4B. The sensor and support circuitry 28 includes an image sensor 40 for sensing an object image and converting the object image into an electrical signal. Image driver circuits 42, regulated by corresponding image driver regulators 43, connected to the image sensor 40 drive the sensor to acquire image data and convert it into a corresponding electrical signal that is representative of the image. The electrical signal generated from the image sensor 40 is sent to a video signal processor 44 via an emitter follower 46. The video signal processor 44 samples and conditions the electrical signal to extract relevant information. The video signal processor 44 of the present invention includes a preamplifier for amplifying the electrical signal. The electrical signal is sampled and held in a sample/hold circuit. After the electrical signals are conditioned, the video signal processor 44 outputs the image information to the processing unit 24.

In the processing unit 24, the electrical signal sent from the video signal processor 44 is received by an analog-to-digital (A/D) converter 48. The A/D converter 48 takes the analog electrical signal and splits it into discrete samples. The discrete samples are then digitized. FIG. 4A shows the A/D converter outputting the digitized signal to the microprocessor 30 and the image storage unit 33, which is non-volatile, solid-state, and has a large storage capacity. In the present invention, the image storage unit could be a SRAM, PSRAM, PROM, EEPROM, or the like. The digitized image signal is then transferred to a later to be described external base unit through a wired transmission link 50.

FIG. 4B shows the A/D converter 48 outputting the digitized signal to a later to be described external control unit through the wireless transmission link 32. Before transmission, the digitized signal is sent to a frame buffer 52. The frame buffer 52 is required if the data transmission rate of link 32 is less than the image sensor readout rate. In the event the transmission rate of link 32 is higher, the frame buffer is not required. A digital signal processor (not shown) could be inserted in FIGS. 4A and 4B and connected to the A/D converter for enabling further image processing.

The timing and operation of both embodiments are controlled by the microprocessor 30. The timing and operation of the microprocessor 30 is set by a programmable array logic circuit 54 and an oscillator 56. The timing and operation commands generated from the microprocessor 30 for the sensing unit 28 are sent via a digital-to-analog converter 60 to video signal processor 44.

In the present invention, the image sensor 40 is preferably a CCD. The CCD is an image array formed from a plurality of photosensitive elements arranged in a matrix of rows and columns having respective electrodes connected in common. Incident light is stored as a charge in one electrode during integration. To read the signal, the charge is shifted to a second electrode, where it induces a voltage change. The voltage change is detected by a sense amplifier connected to the second electrode. The voltage change is transferred out of the CCD as an analog voltage. The CCD is then cleared and prepared to acquire more image information. Although the CCD is preferred, other sensors such as a charged injection device (CID), a stitch sensor, a subframe sensor, or a full frame sensor are within the scope of the present invention.

Regardless of which sensor is used, it is important that the sensor format match the film format of the camera. Matching the sensor format to a 35 mm film is not a problem if the sensor has a one-to-one correspondence with the frame size of the film. However, since the frame size of 35 mm film is approximately 24×36 mm, at the present time it may not be desirable from an economic standpoint to use a single CCD of that size. In fact, a typical commercially available CCD is about ¼ of the 35 mm frame size. Thus, to use a CCD of this size it is necessary to demagnify the image so that the image format matches the sensor format.

There are several approaches to demagnifying the image so that there is a match between the sensor format and the image format. One approach of demagnifying the image is by designing a special objective lens to the reduce the image size. In a SLR camera, it is possible to attach a demagnifying lens in front of the camera, since this type of camera has interchangeable lenses. Another way to demagnify the image is to provide an auxiliary lens or lens assembly in the electronic imaging module optical path to reduce the image size as will described later with reference to such an embodiment shown in FIGS. 2A and 2B, and a second such embodiment in shown in FIGS. 14–16. A third approach of demagnifying an image is by using a fiber optic bundle to refocus the image to a flat plane instead of the usual curved surface. A flat plane results in smaller image than in a conventional curved plane. A fourth approach of matching the image to the sensor format is by designing a sensor for a large film format.

A large format sensor may be provided by fabricating an image array on a substrate separate from a readout array (i.e. amplifiers, shift registers, etc.). After fabrication, the imaging array is then bonded to the substrate using flip-chip technology, or equivalent means that use a contact on the end of each electrode. The contact connects to a trace on the substrate, which then leads to another contact that is connected to the readout array mounted on the same substrate. With this approach, the hybrid integration of the image array and the readout array enables optical matching with larger film formats in a cost effective manner. Additionally, the fabrication technology can be selected independently for the image array and the readout array, and consequently optimized for that particular functionality.

Matching the sensor to the film format of a 110 camera is much easier than in the 35 mm camera because the 110 frame size 13×17 mm is much closer to the size of reasonable priced CCDs that are commercially available at this time.

As noted earlier, the electronic imaging module of the present invention may be embodied to include built-in image demagnifying optics allowing the use of a CCD sensor that than is smaller than the frame size of the camera film format. With reference to FIGS. 2A and 2B, another embodiment of an electronic imaging module, designated 20b therein, is shown configured for use in the same 35 mm camera 10, but includes a centrally disposed, forwardly projecting housing section 62 mounted on the base plate 29. Housing 62 has angled walls that are sized and shaped so that housing 62 conforms to and fits into the camera's exposure chamber 13 when the module 20b is located at its operative position in Camera 10 shown in FIG. 2A, At the forward end of housing 62 is an auxiliary demagnifying lens assembly 64 which is aligned and cooperates with camera objective lens 14 to provide a focused object image that is smaller than the image produced by lens 14 alone at a focal plane 65 that is located forwardly of the camera's normal focal plane 15 at the rear of exposure chamber 13. This embodiment permits the use of a smaller, and less costly, sensor and support circuitry 28b which is mounted in housing 62 behind lens assembly 64 with sensor 40b at the closer focal plane 65. By proper design of lens assembly 64, the image may be reduced to any appropriate smaller frame size (e.g. 12×18 mm) that is compatible with less expensive commercially available CCDs.

Operation of the electronic imaging module 20 (or 20b) is initiated by inserting the module in the camera 10 at its position shown in FIGS. 1A or 2A as the case may be.

To avoid confusion, in the following description of the operation of the electronic imaging module, reference will be made to module 20 only with the understanding that the description applies equally to the modified module 20b unless it is noted otherwise.

The electronic imaging module 20 is inserted so that the sensing means 22 is in alignment with the camera optical path and film plane and the processing unit 24 is located within the film cassette holding location or receiving chamber 17. The adjustable coupling means 26 ensures that the sensing unit 22 and the processing unit 24 fit in many types of cameras. If optional component housing unit 27 is used, it fits into take-up reel chamber 18 with adjustable coupling 27a ensuring proper fit.

The electronic imaging module 20 may optionally include indicia, such as the illustrated stripe(s) or band(s) 68 on the outside of the processing unit 24, representative of an ISO rating for cameras that have the capability of sensing DX formatted film. In the illustrated camera 10 there is contact 69 (only one shown) such film speed indicia.

Once the electronic imaging module 20 has been inserted in the camera, the module is ready to acquire images. However, before data acquisition can occur, the module has to determine whether the camera 10 is ready to initiate acquisition of image data. Data acquisition determination is made by a photodiode 70 and a comparator 72, which are shown in FIGS. 4a–4b forming part of the sensor and support circuitry 28. Photodiode 72 is positioned to sense the intensity of light transmitted along the cameras's optical path toward the sensor 40. When the camera shutter 16 is in its closed or light blocking position, the intensity of light incident on photodiode 72 is very low. When shutter 16 is actuated and begins to open, this light intensity value increases very rapidly.

In particular, the photodiode 70 and comparator 72 detect whether the camera is in an image acquisition state or a download state. If the camera 10 is in the image acquisition state, the electronic imaging module 20 prepares to receive an image. Alternatively, if the camera 10 is in the download state, the electronic imaging module 20 remains off. The photodiode 70 generates a value corresponding to the intensity of incident light detected and outputs that intensity value to the comparator 72. The comparator stores a threshold value which is used to determine whether the camera is in the image acquisition state or download state. More specifically, the comparator compares the intensity value sent from the photodiode 70 to the threshold value. If the intensity value is greater than the threshold value, the comparator 72 generates a data acquisition signal to the processing unit 24, indicating that the shutter 16 is opening and camera 10 is currently being operated to acquire an image. However, if the intensity value is less than the threshold value indicating the shutter is closed, the comparator 72 generates a download signal to the processing unit 24 indicating that the camera is not currently being used to acquire an image.

Although the illustrated embodiment of the present invention uses the photodiode 70 and comparator 72 to sense shutter operation and detect whether the camera is in an image acquisition state or a download state, it is preferred to use the CCD image sensor 40 as an alternative. In order for the CCD to determine the state of the camera, a few timing changes have to be made to the CCD. As mentioned earlier, the CCD sensor 40 typically shifts one line of image data (represented by charge packets) down from one electrode in a vertical (pixel) plane to another electrode in a horizontal register. The voltage change induced by the transfer in charge from the first electrode to the second electrode is then shifted to a sense amplifier. As the charge packets are placed on the sense amplifier, the change in voltage is read out. After reading the voltage change, the charge packets on the sense node are flushed through a reset gate to a drain, so that more charge packets may be read. If the charged packets are summed together, the CCD can be used to determine whether the camera is in a data acquisition state. The charge packets are summed together in one of two ways; 1.) by adding the charge packets from multiple vertical (pixel) rows in the first electrode into the horizontal register of the second electrode or 2.) by adding the charge packets from the horizontal registers in the second electrode onto the sense node. Successive vertical rows are summed together by omitting horizontal shift register clocks between the vertical clocks. Successive horizontal pixels are summed together by eliminating the reset gate clock between successive horizontal pixels. In effect, by eliminating and rearranging the existing clock sequences in either approach, the effective signal of the CCD is increased, enabling it to determine whether the shutter 16 is open or not.

If the CCD sensor 40 is used to detect whether the camera is in an image acquisition state or in a download state, the sensor 40 must account for situations where the module is removed from the camera and placed in light. To prevent a picture from being taken, a time out feature is used. In particular, the processing unit 24 receives an integration timing signal representative of a picture taking sequence. The processing unit 24 compares the integration timing signal to a predetermined threshold value (i.e. one second) stored within the processing unit. The processing unit 24 generates a sleep signal when the integration timing signal is greater than the predetermined threshold value, turning the electronic imaging module 20 off. If the integration timing signal is less than the predetermined threshold value, the processing unit 24 generates a download signal.

After it has been determined that the camera 10 is in a data acquisition state, the electronic imaging module 20 is initiated by the battery 34 located in the processing unit 24 or alternatively in the component housing unit 27, if used. The battery 34 is preferably of the lithium type but other equivalents are within the scope of the present invention. The voltage generated from the battery 34 is sent to a power conversion and distribution circuit 74 (see FIG. 7) for distributing power to the sensing unit 22 and the processing unit 24.

Once the electronic imaging module 20 has been powered up, the sensing unit 22 is ready to receive image data. The sensing unit 22 converts the optical object image into a corresponding electrical signal and conditions the signal to extract relevant information. The sensing unit 22 then transfers the electrical signal to the processing unit 24 where the signal is either transmitted immediately on the transmission link 32 to an external control unit 76 or stored in the image storage unit 33 for transmission to a base unit 78.

The interaction of the electronic imaging module 20 and the external control unit 76 are shown schematically in FIG.

6. The control unit 76 is a remote reader unit that enables the user to perform image processing and to display the acquired object image immediately. The control unit 76 includes a display 80 for displaying the object image and a command panel 82 with various selection keys 84 for performing image processing. In particular, there are selection keys 84 for controlling receipt of transmitted data, data compression, data storage, display, resolution, and color management. In this embodiment, every object image is immediately transmitted from the electronic imaging module 20 to the control unit 76. This permits the user to view each image immediately or view all of the images after the frames on the module 20 have been completed.

Figure 7:
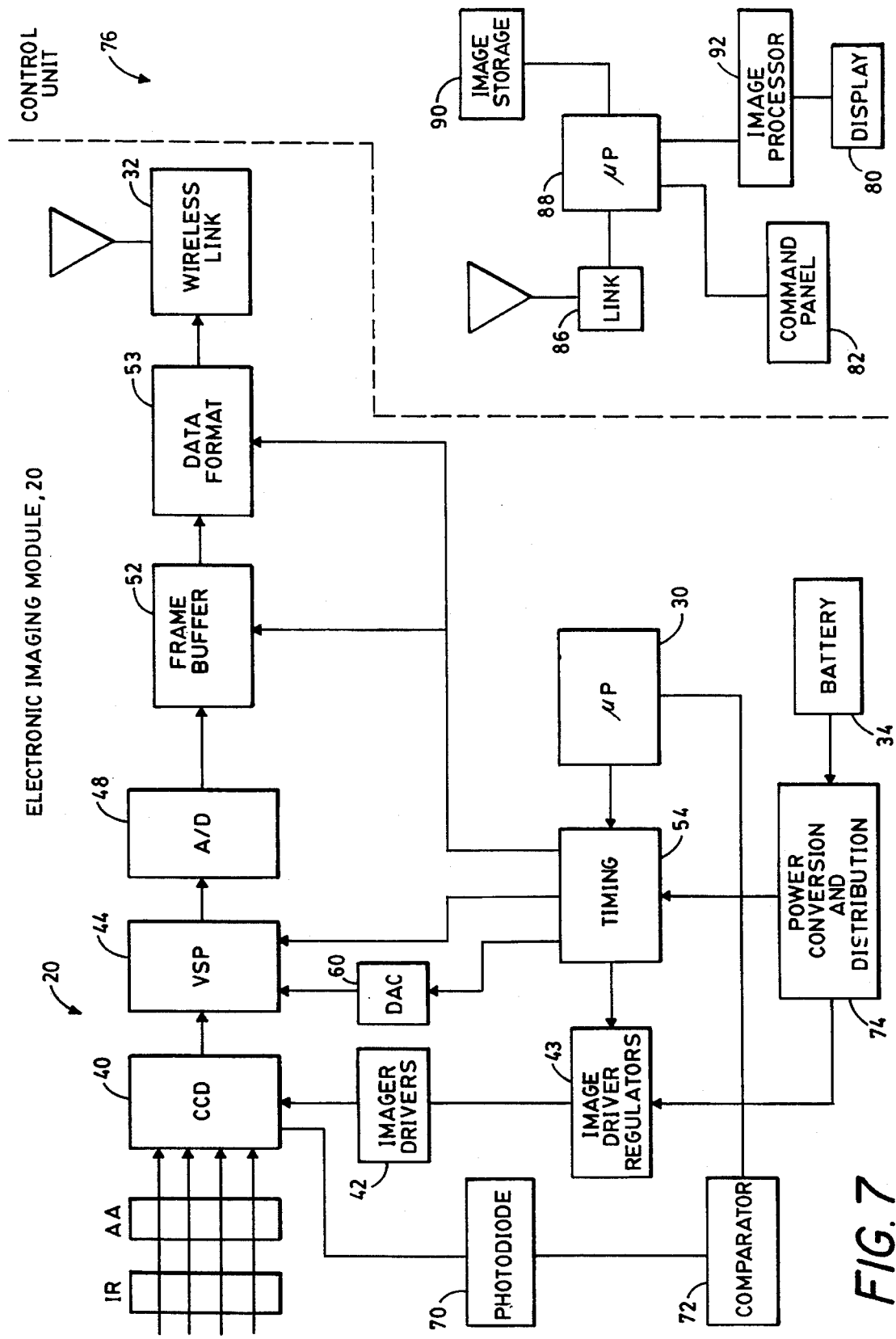
FIG. 7 is a block diagram showing the electrical functions of the electronic imaging module and the control unit.

A block diagram of the electronic imaging module 20 and the control unit 76 is shown in FIG. 7. In this embodiment, an object image is sensed by the CCD 40 in accordance with the camera film format and converted into an electrical signal. Optionally the light impinging on CCD 40 may be filter with an infrared filter (IR) and/or an anti-aliasing filter (AA) positioned in front of CCD 40. The video signal processor 44 conditions the electrical signal and outputs it to the A/D converter 48 for digitization. The frame buffer 52 holds the electrical signal temporarily and outputs the signal to a data formatter 53. After the signal has been formatted for transmission, it is sent to the control unit 76 by the transmission link 32. The signal is received by the control unit 76 at a link 86. Links 32 and 86 are preferably wireless and operate on either a radio or infrared frequency. Infrared signals from the electronic imaging module 20 may by provided on the back side of the module for transmission through a window (not shown) generally provided in the camera rear door 12, in alignment with the cassette receiving chamber 17, through which the user may read the film speed label when a conventional 35 mm film cassette is located therein.

The link 86 transfers the signal to a microprocessor 88. Through the use of the command panel 82, the image can be stored in an image storage unit 90, processed by an image processor 92, or displayed on the display 80.

Figure 8:
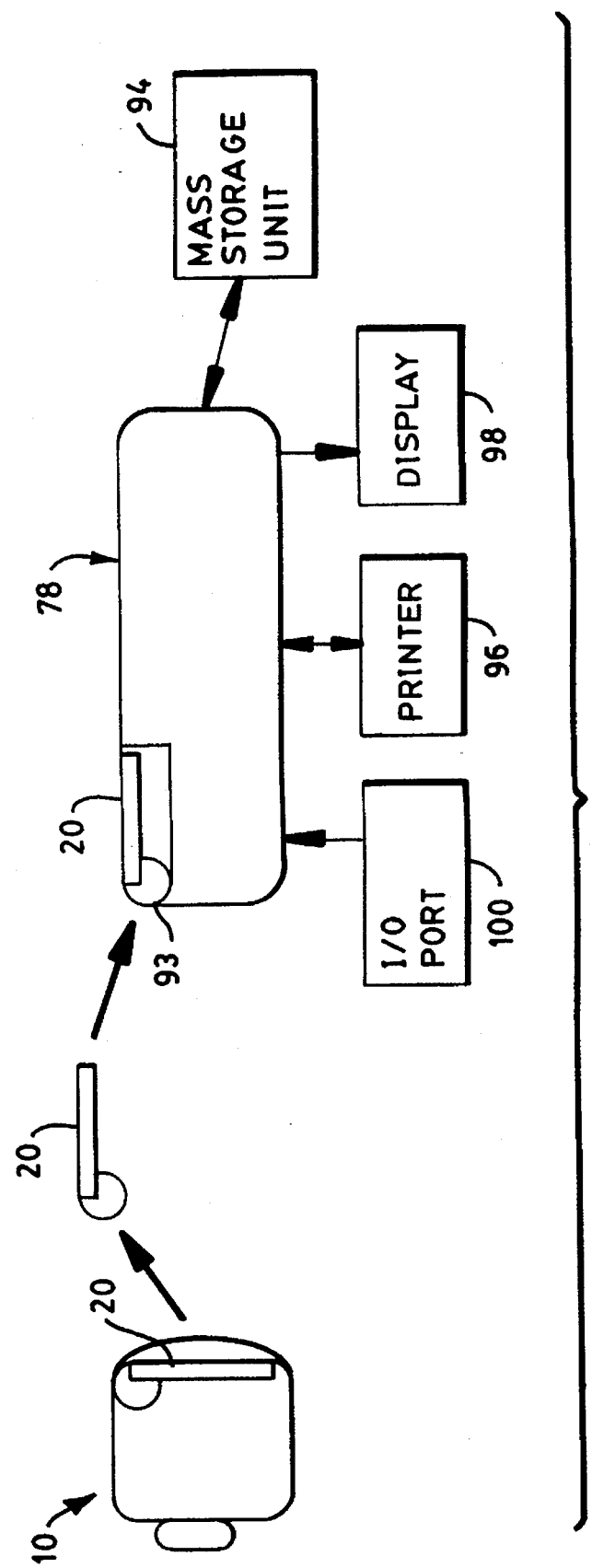
FIG. 8 is a schematic representation of the electronic imaging module interacting with a base unit.

FIG. 8 shows a schematic of the electronic imaging module 20 interacting with the base unit 78. The base unit 78 is a player unit that includes a wired link 93 complementary to receive the wired transmission link 50 of the electronic imaging module 20 a mass storage unit 94 for storing a plurality of images, a printer 96 for printing the images, a display 98 for displaying the images and an I/O port 100 providing a user interface for initiating image processing. In this embodiment, the electronic imaging module 20 is removed from the camera 10 after all the frames have been taken. However, the module 20 may be removed at any time to retrieve stored images. The module 20 is inserted in the base unit 78 such that there is a connection between the link 93 and wired transmission link 50. The images can be stored in the mass storage unit 94 and copied to an electronic memory card or an optical disk for permanent archiving. Also, the images may be printed on the printer 96, or viewed on the display 98.

Figure 9:
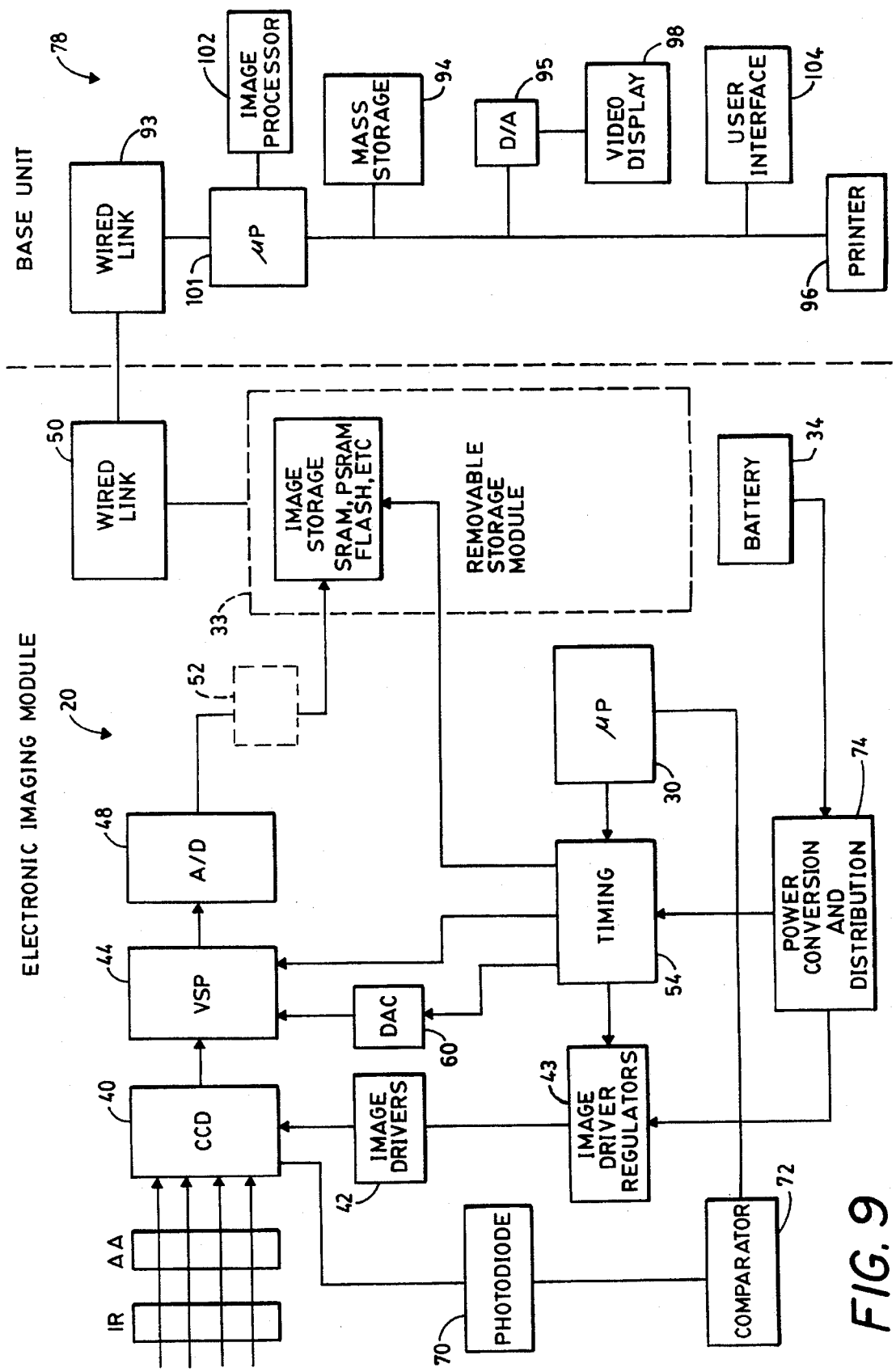
FIG. 9 is a block diagram showing the electrical functions of the electronic imaging module and the base unit.

A block diagram of the electronic imaging module 20 and the base unit 78 is shown in FIG. 9. In this embodiment, an object image is sensed by the CCD 40 in accordance with the camera film format and converted into an electrical signal. The video signal processor 44 conditions the electrical signal and outputs it to the A/D converter 48 for digitization. The digitized signal is stored in the image storage unit 33 which may be a permanent component of module 20 or may be configured as a removable type of unit 33. If it is the later type, once the image storage unit 33 is filled to capacity, it may be removed and replaced with another storage unit 33. Connected to the removable image storage unit 33 is the wired transmission link 50. When the image storage unit 33 is filled to capacity, it is removed and connected to the base unit 78 such that the wired transmission link 50 is connected to the base unit at the link 93. Both the links 50 and 93 are preferably wired. The image information is transferred from the link 93 to a microprocessor 101 for processing. The image can be stored in the mass storage unit 94, printed on the printer 96, viewed on the display 98, or sent to an image processor 102. The above options are selected through a user interface 104 which may include a menu display of choices and button switches, a keypad, mouse, etc. for making menu selections.

Figure 10:
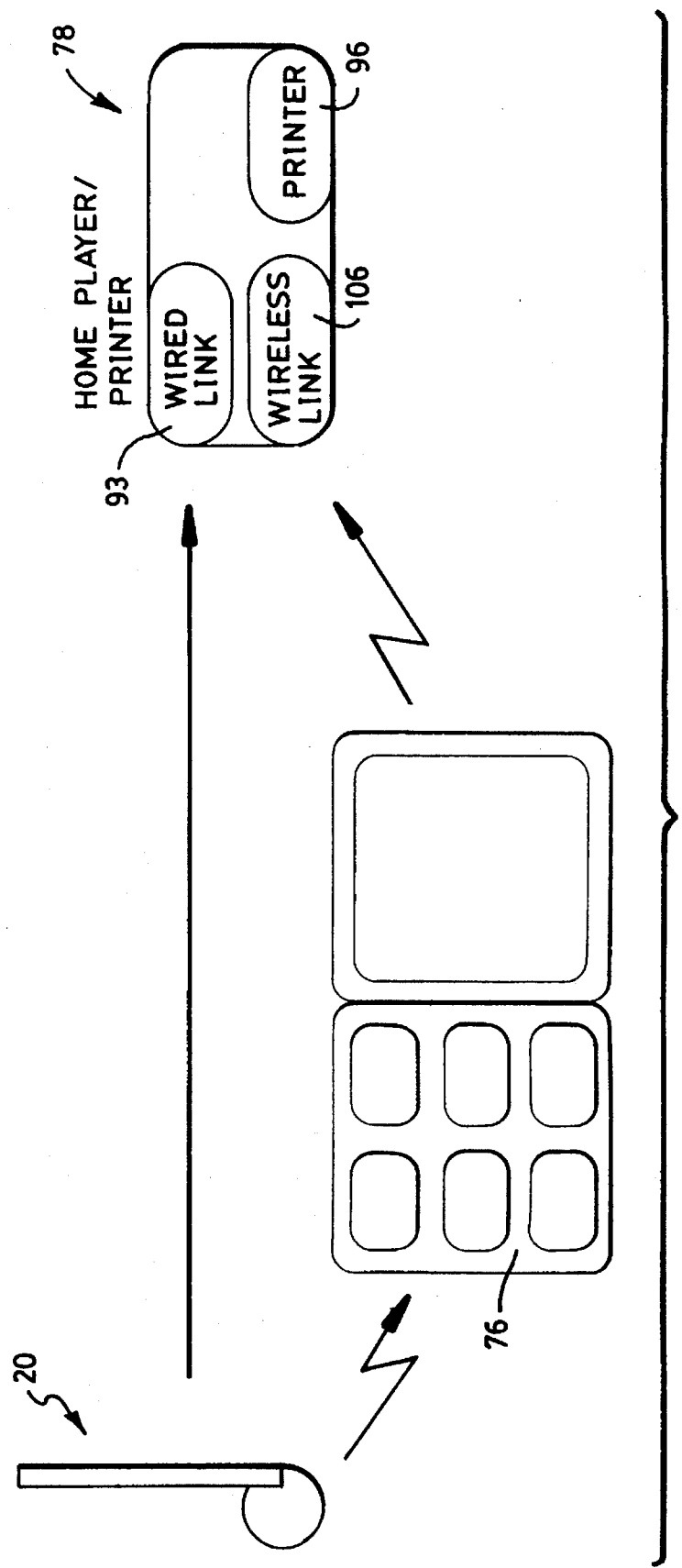
FIG. 10 is a schematic representation of the electronic imaging module interacting with the control unit and the base unit.

FIG. 10 shows a schematic of an embodiment where the electronic imaging module 20 is used in conjunction with both the control unit 76 and the base unit 78. In this embodiment, an electrical signals representative of an object image is simultaneously stored in the image storage unit 33 and transmitted from the electronic imaging module 20 to the control unit 76. The user can view each image immediately at the control unit 76 on the display 80 and process the image by using the command panel 82 and selection keys 84. Also, the user has the option of transmitting the image signals from the control unit 76 to the base unit 78 by using the wireless links 86 and 106. After receiving the image, it may be stored or printed at the base unit 78. If the user does not want to store or print the images immediately, the user can wait and remove the module 20 from the camera 10 after all of the frames have been taken and insert it in the base unit 78 at the wired link 93. Then the images can be stored in the mass storage unit 94, printed on the printer 96, or viewed on the display 98.

Figure 11:
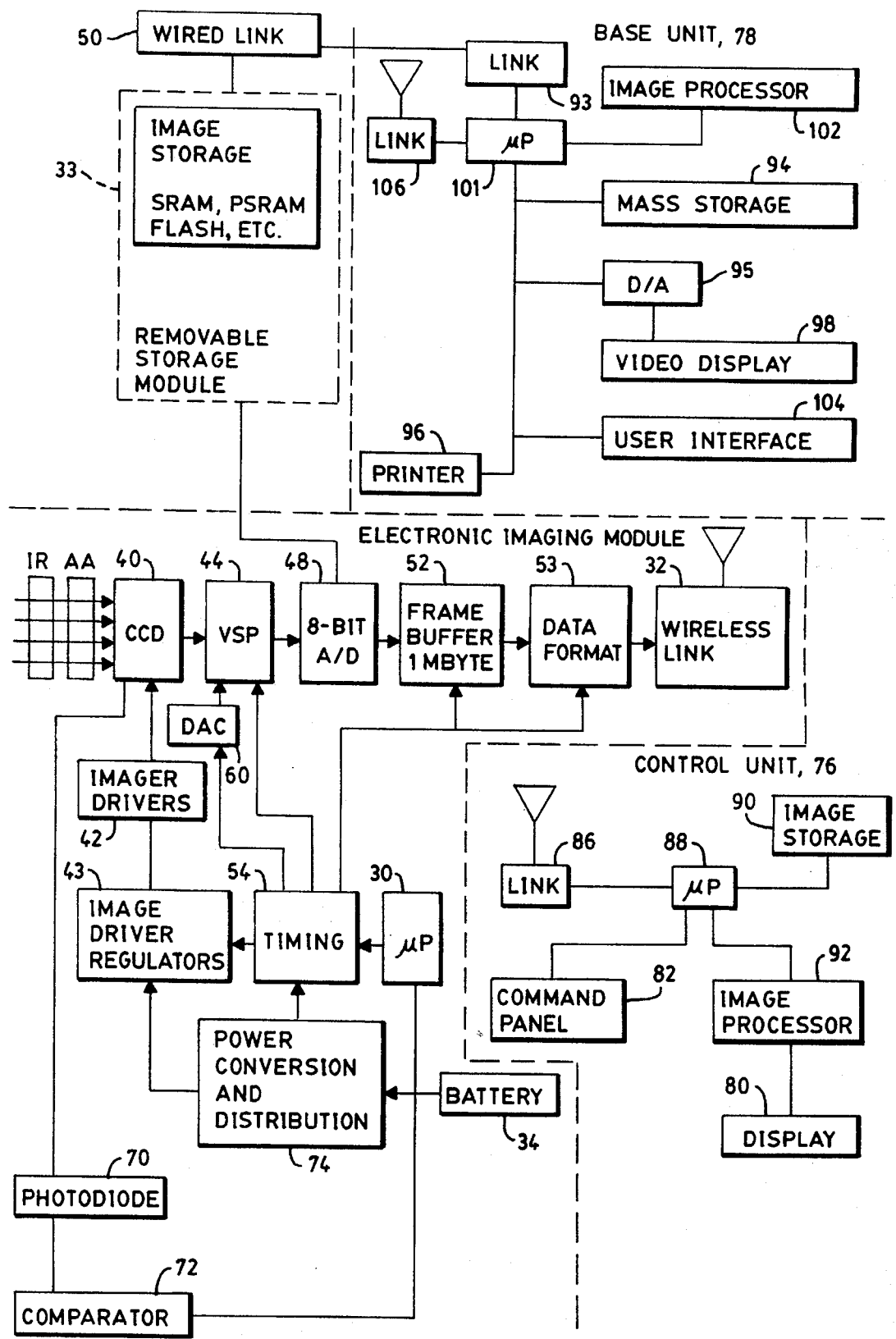
FIG. 11 is a block diagram showing the electrical functions of the electronic imaging module, the control unit, and the base unit.
Figure 12:
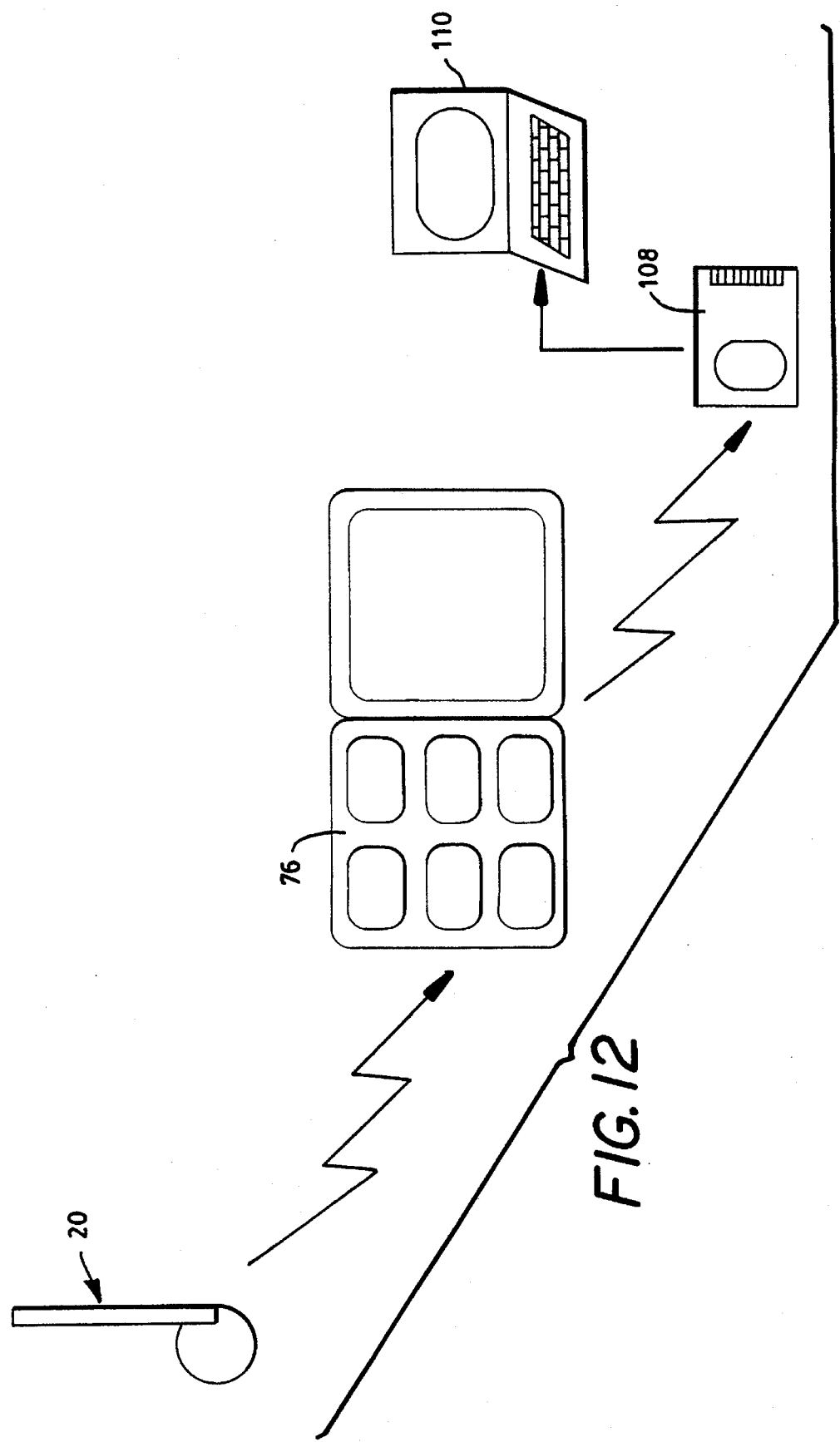
FIG. 12 is a schematic representation of the electronic imaging module and the control unit interacting with PCMCIA card.

A block diagram of the electronic imaging module 20 being used with the control unit 76 and the base unit 78 is shown in FIG. 11. In this embodiment, the object image is sensed by the CCD 40 in accordance with the camera film format and converted into an electrical signal. The video signal processor 44 conditions the electrical signal and outputs it to the A/D converter 48 for digitization. The A/D converter sends the electrical signal to the image storage unit 33 and the frame buffer 52. The frame buffer 52 holds the electrical signal temporarily and outputs the signal to the data formatter 53. After the signal has been formatted for transmission, it is sent to the control unit 76 by the wireless transmission link 32. The signal is received by the control unit 76 at the wireless link 86. The link 86 transfers the signal to the microprocessor 88. Through the use of the command panel 82, the image can be stored in the image storage unit 90, processed by the image processor 92, displayed on the display 80, or transmitted to the base unit 78 for archival storage or printing.

In addition to being transmitted by the wireless transmission link 32, the electrical signal is stored at the image storage unit 33. When the image storage unit 33 is filled to capacity, it is removed and connected to the base unit 78 such that the wired transmission link 50 is connected to the link 93. The image information is transferred from the link 93 to the microprocessor 100 for processing. The image can be stored in the mass storage unit 94, printed on the printer 96, viewed on the display 98, sent to the image processor 102.

Another embodiment of the present invention is to use the electronic imaging module 20 and the control unit 76 with a Personal Computer Memory Card International Association (PCMCIA) card 108 that has a radio frequency transceiver embedded therein and a personal computer 110. FIG.

12 shows a schematic of the electronic imaging module 20 and the control unit 76 operating in conjunction with a PCMCIA card 108 and a PC (personal computer) 110. After the images are processed and viewed at the control unit 76, the user transmits the processed images to the PCMCIA card 108, which is preferably an electronic memory card or an optical card. The image signals are received at the RF transceiver embedded in the PCMCIA card and are stored in memory. Then the PCMCIA card 108 is inserted in the PC 110 so that the image signals can be retrieved by PC 100 for image processing. After processing, a hard copy of the images may be printed by a printer (not shown) attached to PC 110.

Figure 13A:
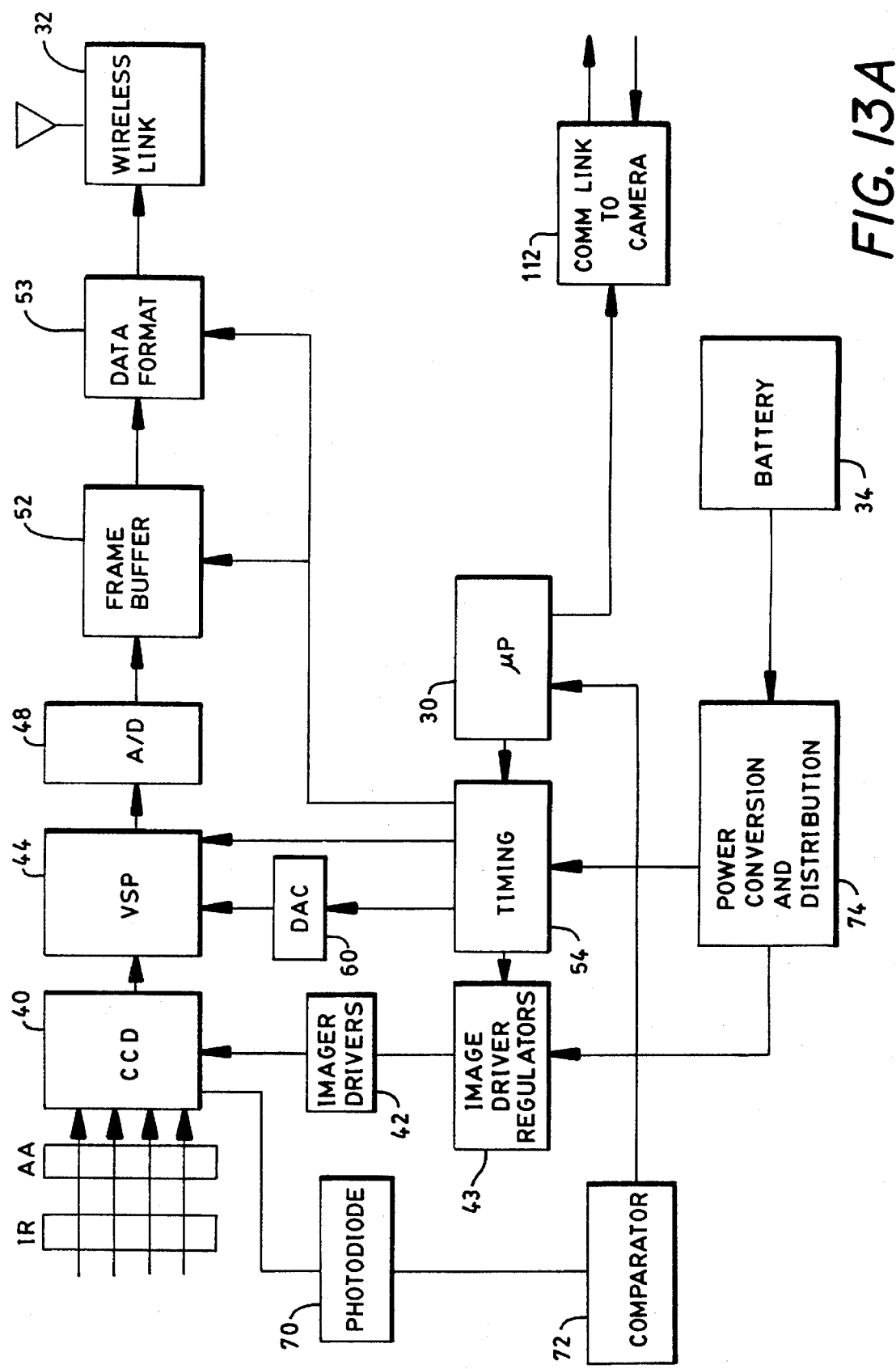
FIGS. 13a–13b are block diagrams showing the electronic imaging module having a communication channel with the camera.
Figure 13B:
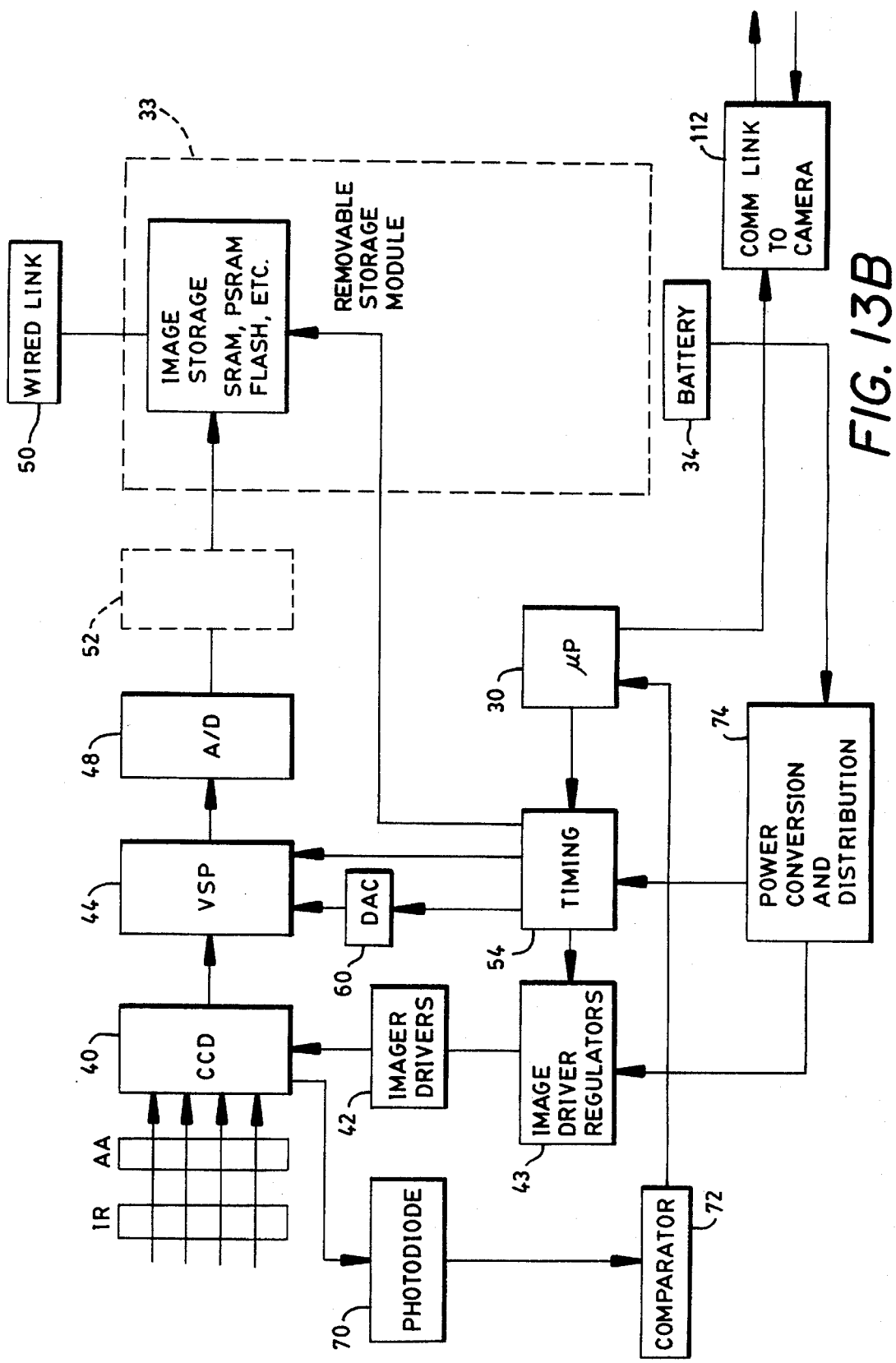

Still another embodiment of the present invention, is to use a communication channel in the electronic imaging module 20 for enabling communication with a custom camera 10, in which the module is located, that has been adapted to establish such a communication channel with module 20. FIGS. 13a–13b show a block diagram of an electronic imaging module 20 having a communication link 112 connected to the microprocessor 30 for the embodiments having a wireless transmission link 32 and an image storage unit 33, respectively. In the present invention, the communication link 112 could be an infrared beam, an induction loop, an electrical wire, a mechanical connector or a physical connector which interfaces with a compatible communication port provided in camera 10. The communication link 112 enables the camera 10, upon actuation, to initiate the activation of the module 20 and to exchange information relating to picture events (i.e. control signals or data parameters). For example, the camera 10 may provide information relating to shutter open/close, exposure conditions, aperture selection, and the like.

As noted earlier, the electronic imaging module embodying the present invention is not restricted for use with conventional film cameras (e.g. 35 mm or 110 format) but it also may be configured for use with cameras that use self developing film.

Figure 14:
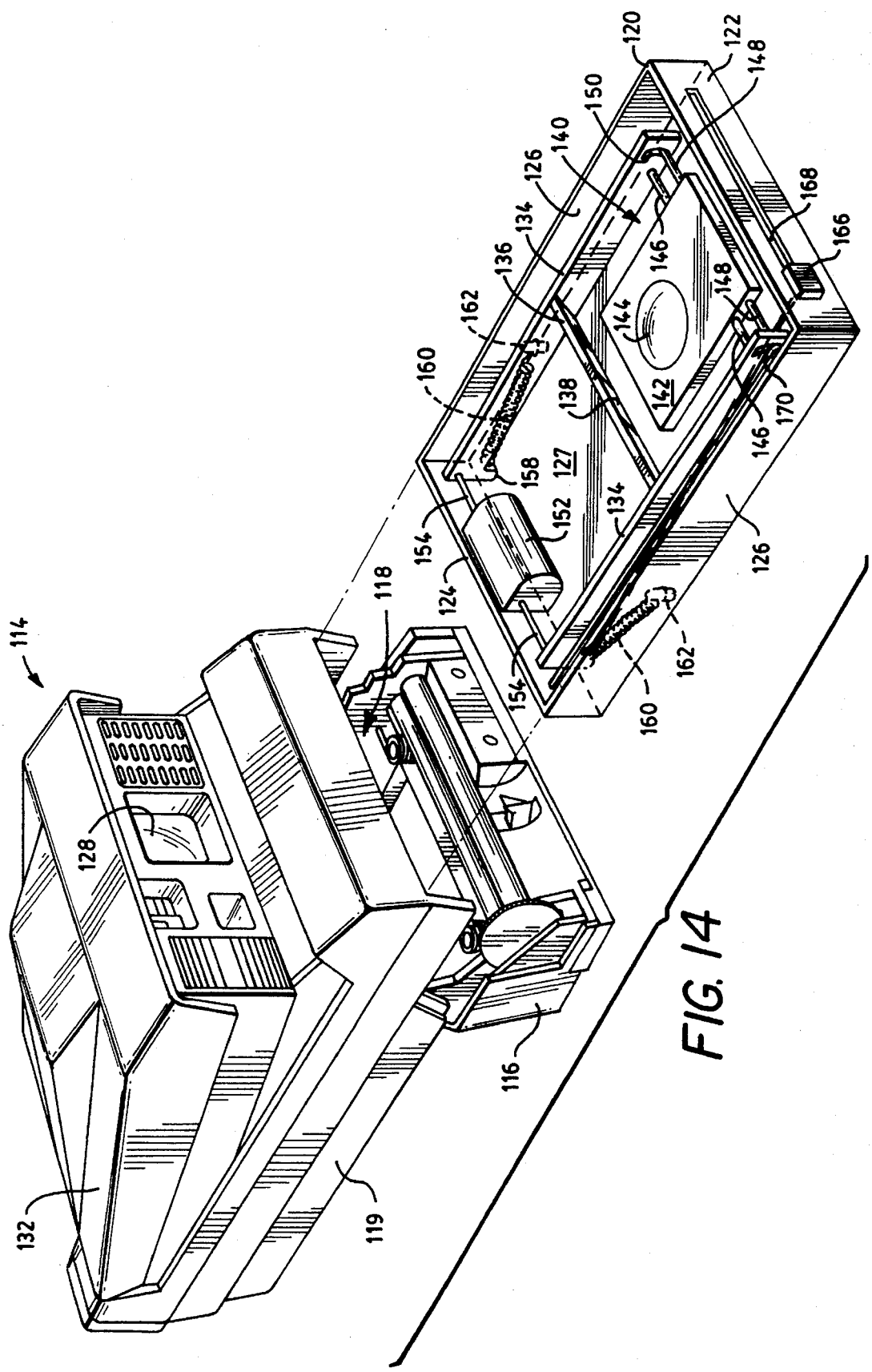
FIG. 14 is a perspective view of a self developing camera and an electronic imaging module configured for use therewith shown in its folded position.

FIG. 14 shows a self developing camera 114 and an electronic imaging module 20c that is configured for use therewith. Camera 114 is of the folding type shown in its erected position with a pivotally mounted, leading end, pressure roller housing door 116 in its open position providing access to the open end of a horizontal film cassette receiving chamber 118 in base section 119 of camera 114.

The electronic imaging module 20c is adapted to be slidably inserted into the receiving chamber 118, in place of a regular self developing film cassette, to reversibly convert camera 114 into an electronic imaging camera.

Module 20c includes a generally rectangular component support frame 120 formed by a leading end wall 122, a trailing end wall 124, a pair of side walls 126 and a bottom wall 127. Frame 120 is of substantially the same size and shape as a regular self developing film cassette so that module 20c fits securely into chamber 118. In FIG. 14, later to be described components of module 20c, movable mounted on frame 120, are shown in their folded and inoperative position to allow insertion of module 20c into chamber 118. Once module 20c is fully inserted in chamber 118, those component are adapted to move to an erected operative position (shown in FIGS. 15 and 16 when camera 114 is in its erected position.

A regular self developing film cassette for use in camera 114 typically holds a stack of self developing film units, a spring for urging the stack upwardly to locate the top film unit at the camera's film exposure plane, and a flat battery to power various camera components.

Such film units typically have a relatively large image area (e.g. approximately 3.5×3 inches) compared to a 35 mm frame (24×36 mm) and required a considerably longer optical path from the camera's objective lens to the film exposure plane to fill this larger image area.

Figure 15:
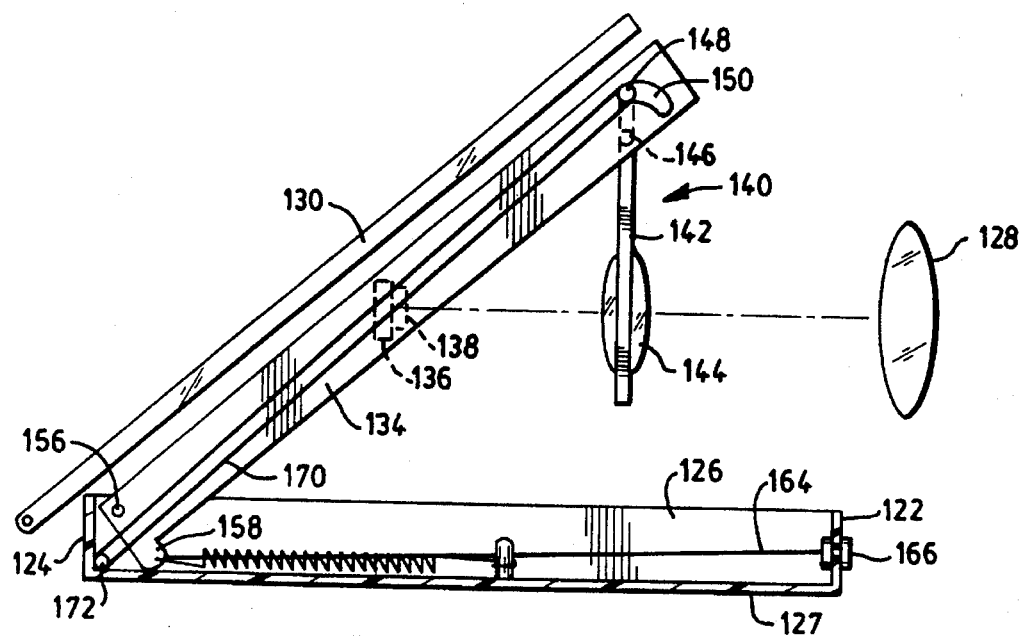
FIG. 15 is a side elevation view of the electronic imaging module of FIG. 14 shown in its erected position.

To make such cameras more compact, often a folded optical path is employed. As shown in FIGS. 14 and 15, the illustrated camera 114 has an objective lens 128 and employs an angled mirror 130, supported on the underside of a camera top wall section 132, for folding the optical path downwardly, about 90 degrees, to the horizontal film exposure plane in chamber 118.

Camera 114 is of the folding type, and is shown in its erected position in FIG. 14. When folded (not shown), the top wall section 132 pivots downwardly toward the film receiving chamber 118 in base section 119 carrying mirror 130 therewith to an inoperative folded position overlying the exposure plane for making the camera even more compact when it is not in use. Only those portions of camera 114 necessary to understand the present invention will be describe in detail herein. A more complete description of the structure and operation of this type of camera may be found commonly assigned U.S. Pat. No. 4,508,440.

The electronic imaging module 20c could be provided with a very large area image sensor or CCD covering the full 3.5×3 inch image area of the self developing film format, along with the comparable components and a power source or battery included in the previously described electronic imaging modules 20 and 20b, without requiring inclusion of auxiliary optics to modify camera's 114 optical imaging system provided by lens 128 and mirror 130.

However, at this time the cost of such a large area CCD is very high. A much less costly module 20c may be produced by using a small CCD in combination with auxiliary demagnifying optics to reduce the size of the image provided by camera lens 128. Such a module 20c is shown in FIGS. 14–16.

Module 20c includes a pair of longitudinally extending erecting arms 134 joined near the middle thereof by a transverse angled cross bar 136, having a forwardly facing small commercially available CCD 138 fixedly mounted thereon, and near the leading end thereof by a pivotally mounted auxiliary lens assembly 140. Assembly 140 comprises a rectangular support plate 142 having an auxiliary demagnifying lens 144 mounted thereon, a pair transverse pivot pins 146 connected to erecting arms 134 and a pair of transverse actuating pins 148 extending through corresponding arcuate guide slots 150 in the leading ends of erecting arms 134 which are used for effecting pivotal movement of assembly 140.

When erecting arms 134 are moved to the folded position (see FIG. 14) overlying the bottom wall 127 of frame 120, the lens assembly 140 is automatically pivoted to its folded position wherein support 142 is substantially parallel to the bottom wall 127. None of the components extend above the open top of frame 120 allowing module 20 to be slidably inserted into and removed from the cassette receiving chamber 118 without interference from these module components.

Figure 16:
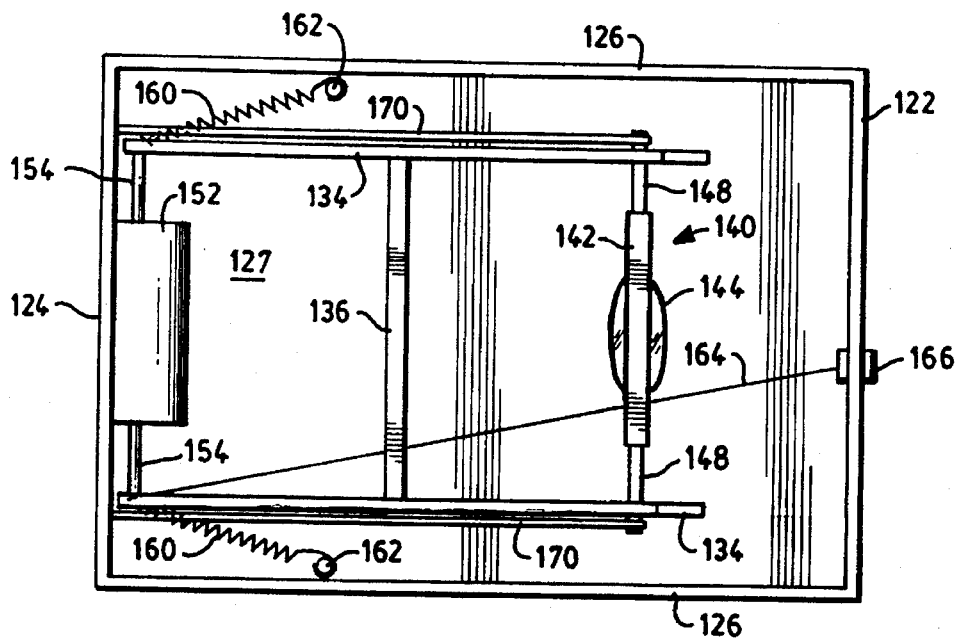
FIG. 16 is top planar view of the electronic imaging module of FIG. 15.

Once module 20c is in chamber 118, the erecting arms 134 are pivoted upwardly, and lens assembly 140 is pivoted downwardly to the operative position as shown in FIGS. 15 and 16 to locate auxiliary lens 144 and sensor 138 in optical alignment with the camera lens 128 to provide a focused image of the correct size on sensor 138.

The illustrated module 20c includes a components housing 152 mounted on trailing end wall 124 for containing the various electronic components including a microprocessor 30, a wireless transmission link 32 (FIG. 3A), and/or an image storage unit 33 with a wired transmission link (FIG. 3B), a battery 34 various circuit boards described earlier with respect to electronic imaging modules 20 and 20b.

Extending transversely through housing 152 is rotatable pivot shaft 154 to which the trailing ends of the erecting arms 134 are fixedly connected at pivot points 156 for rotation with shaft 154 between the erected and folded positions.

Each of the erecting arms 134 is spring biased toward the erected operative position of FIGS. 15 and 16. As best shown in FIG. 15, each of the arms 134 has a depending tab 158 below pivot point 156 to which is attached one end of a helical biasing spring 160 having its opposite end attached to an upstanding post 162 fixed to the bottom wall 127 of frame 120. The tension force of spring 160 on tab 158 causes arm 134 to pivot in a counter clockwise direction about pivot point 156 toward the erected position. Although not shown in the drawings for visual clarity, the upper edges of arms 134 are urged into engagement with the under interior side of camera housing wall section 132, on opposite sides of mirror 130, which serve as a stop to accurately locate arms 134 in the erected position.

Arms 134 are pivoted downwardly to the folded position and are releasably maintained there by the action of a fixed length, substantially rigid keeper link 164. Link 164 has its trailing end connected to the depending tab 158 of the left erecting arm 134, as viewed facing the leading end of frame 120. The leading end of link 164 is connected to the interior side of a slider button 166 that is captured in a laterally extending guide slot 168 in frame leading end wall 122 for sliding movement therealong.

The length of link 164 is fixed such that when button 166 is in its left most position, shown in FIG. 14, its forward end is held by button 166 captured in slot 68 and it extends rearwardly parallel to arm 134 and serves as a compression link that exerts a rearwardly directed force on tab 158. Because this force is applied below pivot point 156, a clockwise moment is generated causing arm 134 to rotate downwardly its folded position. This moment is sufficient to overcome the forces of springs 160 which elongate when the arms 134 are folded to increase the upward bias force for raising arms 134 when the compression force applied by keeper link 164 is released.

Once the folded module 20c is fully inserted into camera chamber 118, the user releases the keeper link 164 by manually moving button 166 to the right. As the forward end of link 164 moves to the right, link 164 essentially becomes the hypotenuse of a right triangle having sides formed by arm 134 and leading end wall 122. As the leading end of link 164 moves to the right the hypotenuse becomes longer. Because the length of link 164 is fixed and the track of the leading end of link 164 if fixed as a result of button 166 being captured slot in slot 168, the trailing end of link 164 must move forward to comply with its role as the hypotenuse. Accordingly, this forward movement of the trailing end on link 164 substantially reduces the compressive force it applies to arm 134 so that they may move to the erected position by forces applied by springs 160.

The pivoting movement of erecting arms 134 between the folded and erected positions is used advantageously in combination a pair of fixed length, substantially rigid compression links 170 for effecting movement of the lens assembly 140 between its folded, inoperative position of FIG. 14 and its erected operative position shown in FIGS. 15 and 16. Each links 170 is located outboard of its corresponding erecting arm 134 and has its trailing end pivotally coupled frame end wall 124 at pivot point 172 and its leading end pivotally connected the outboard end actuating pin 148 extending through guide slot 150.

The length of links 170 is fixed such that when arms 134 are in the erected position (see FIG. 15) link 170 hold its corresponding actuating pin 148 at the trailing end of guide slot 150 to maintain the lens assembly 140 in its vertical operative position locating lens 144 in alignment with the camera lens 128 and the sensor 138.

When the arms 134 are lowered, links 170 apply a compressive force on pins 148 creating a clockwise moment which cause assembly 140 to pivot clockwise about pivot pins 146 to its folded horizontal position of FIG. 14. Conversely, when the arms 134 are raised, the links 170 pull on pins 148 and cause assembly 140 to pivot on a counter clockwise direction to its operative erected position.

When it is desired to remove module 20 from camera 114, the user manually moves button 166 to the left which causes the trailing end of link 164 to move rearwardly and apply its compressive force to tab 158 thereby moving the arms 134 downwardly to the folded position. The links 170 automatically cause the lens assembly 140 to be folded and module 20c may be removed from camera 114.

In operation, lenses 128 and 144 focus an optical image on sensor 138 which provides an electrical signal representative of the image. That signal is then processed, stored and/or transmitted in the same manner as disclosed earlier in regard to electronic imaging module 20 or 20b.

The present invention has disclosed an electronic imaging module which is removably insertable in a photographic camera for reversibly converting the camera to an electronic imaging camera. Thus, if a person does not want to use the electronic imaging module, it can be easily removed from the camera and replaced with conventional silver halide film. The electronic imaging module includes a sensing unit, a processing unit, and a coupling unit. The sensing unit detects an object image and converts the image to a corresponding electrical signal. The processing unit is configured to fit into the camera's film cassette holder and includes a storage unit for storing the electrical signal and/or a transmission link for transmitting the electrical signal to external devices. The external devices perform common image processing steps like printing, viewing, storing, etc.

It is therefore apparent that there has been provided in accordance with the present invention, an electronic imaging module that fully satisfies the aims and advantages hereinbefore set forth. While this invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

We claim:

1. An electronic imaging module removably insertable in film cassette holder of a photographic camera which is adapted to hold photographic film in a film plane transverse to an optical path of which optically transmits an object image of an object into the photographic camera, the electronic imaging module for reversibly converting the photographic camera into an electronic imaging camera, the electronic imaging module comprising:

means for sensing the object image in accordance with the camera film format and initiating image acquisition in the camera in response to sensing the object image such that the object image is converted into an electrical signal corresponding to the object image;

means for processing the electrical signal into a format suitable for transmission, the processing means being configured for location within the camera film cassette holder;

means for coupling the sensing means to the processing means, the coupling means being adjustable to align the sensing means with the optical path of the photographic camera and maintain the processing means within the film cassette holder of the camera.

2. An electronic imaging module according to claim 1 further comprising means for securing the electronic imaging module within the film cassette holder of the photographic camera such that the sensing means is aligned with the optical path and film plane.

3. An electronic imaging module according to claim 1, wherein the sensing means comprises a charge-coupled device ("CCD") and a comparator coupled to the processing means, the CCD detecting light and generating an intensity value to the comparator which compares the intensity value to a predetermined threshold value stored within the comparator, the comparator generating an image acquisition signal to the processing means when the CCD intensity value is greater than the threshold value and a download signal when the CCD value is less than the threshold value.

4. An electronic imaging module according to claim 1, wherein the sensing means comprises means for turning off the module, the turning off means receiving an integration timing signal representative of a picture taking sequence and comparing the integration timing signal to a predetermined threshold value, the turning off means generating a sleep signal when the integration timing signal is greater than the predetermined threshold value and generating a download signal when the integration timing signal is less than the predetermined value.

5. An electronic imaging module according to claim 1 further comprising a communication channel for enabling communication with the photographic camera where the photographic camera is adapted to interface with the electronic imaging module, the communication channel exchanging image information relating to a picture taking sequence.

6. An electronic imaging module according to claim 1, wherein the processing means comprises transmitting means disposed within the electronic imaging module for transmitting the electrical signal to an external unit via a wireless link.

7. An electronic imaging module according to claim 6, wherein the transmitting means transmits the electrical signal through a film speed window in the photographic camera.

8. An electronic imaging module removably insertable into an exposure chamber of a photographic camera which is adapted to hold photographic film therein, the photographic camera having a lens for focusing light about an optic axis to transmit optically an object image of an object into the photographic camera, the electronic imaging module for reversibly convening the photographic camera into an electronic imaging camera, the electronic imaging module comprising:

a housing dimensioned to fit within exposure chamber of the photographic camera having a generally cylindrical body and a flat section extending therefrom where the flat section lies along a film plane of the photographic camera substantially perpendicular to the optic axis;

initiation means disposed within the flat section for detecting a presence of light and for moving the electronic imaging module between an inactive mode and an active mode in response thereto, the inactive mode being a normal state for conserving power, the active mode being for image acquisition where the initiation means signals the electronic imaging module to prepare to receive an image;

sensing means disposed in the flat section of the housing for acquiring the object image during the active mode and converting the object image into a corresponding image signal; and processing means disposed in the body in electrical communication with the sensing means for processing the electrical signal into a format suitable for transmission.

9. An electronic imaging module according to claim 8, wherein the initiation means comprises photosensitive means for detecting light within the camera and for generating an intensity signal representative of the intensity of the light; and threshold means in electrical communication with the photosensitive means for comparing the intensity signal from the photosensitive means with a threshold value, if the intensity signal exceeds the threshold value then the electronic imaging module is switched to the active mode, if the intensity signal is less than the threshold value then the electronic imaging module is switched to the inactive mode.

10. An electronic imaging module according to claim 9, wherein the photosensitive means is a photodiode disposed proximal to the optical path.

11. An electronic imaging module according to claim 9, wherein the intensity signal exceeding the threshold value is indicative of a shutter in the photographic camera opening, and the intensity signal being less than the threshold value is indicative of the shutter being closed.

12. An electronic imaging module according to claim 9, wherein the photosensitive means is the sensor means and the sensor means has a photodetect mode for detecting light within the camera and a image sensing mode for acquiring the object image from the light.

13. An electronic imaging module according to claim 12, wherein the sensor means is a charge coupled device ("CCD") having a first timing for operating in the photodetect mode and having a second timing for operating in the image sensing mode.

14. An electronic imaging module according to claim 8, wherein the processing means further comprises overexposure means for preventing image acquisition when the electronic imaging module is outside of the photographic camera by detecting excessive light and moving the electronic imaging module to the inactive mode when excessive light is detected.

15. An electronic imaging module according to claim 14, wherein the overexposure means compares an integration timing signal representative of a picture taking sequence to a overexposure threshold value and generates a sleep signal, if the integration timing signal is greater than the overexposure threshold value then the overexposure means moves the electronic imaging module into the inactive mode, if the integration timing signal is less than the overexposure threshold value then the overexposure means moves the electronic imaging module into the active mode.

16. An electronic imaging module according to claim 8, wherein the sensing means comprises a charge-coupled device ("CCD") and a comparator coupled to the processing means, the CCD detecting light and generating an intensity value to the comparator which compares the intensity value to a predetermined threshold value stored within the comparator, the comparator generating an image acquisition signal to the processing means when the CCD intensity value is greater than the threshold value to move the electronic imaging module to the active mode, and generating a download signal when the CCD value is less than the threshold value to move the electronic imaging module to the inactive mode.

17. An electronic imaging module according to claim 8 further comprising a communication channel for enabling communication with the photographic camera where the photographic camera is adapted to interface mechanically with the electronic imaging module, the communication channel exchanging image information relating to a picture taking sequence.

* * * * *